United States Patent
Hikichi

(10) Patent No.: US 9,503,600 B2
(45) Date of Patent: Nov. 22, 2016

(54) IMAGE FORMING APPARATUS THAT SHIFTS INTO DIFFERENT POWER SAVING STATES AND CONTROL METHOD THEREOF

(71) Applicant: CANON KABUSHIKI KAISHA, Tokyo (JP)

(72) Inventor: Atsushi Hikichi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/868,824

(22) Filed: Sep. 29, 2015

(65) Prior Publication Data

US 2016/0105581 A1 Apr. 14, 2016

(30) Foreign Application Priority Data

Oct. 9, 2014 (JP) .................. 2014-208340

(51) Int. Cl.
*H04N 1/00* (2006.01)
*G06F 1/32* (2006.01)
*G06K 15/00* (2006.01)

(52) U.S. Cl.
CPC ........ *H04N 1/00891* (2013.01); *G06F 1/3209* (2013.01); *G06F 1/3284* (2013.01); *G06F 1/3287* (2013.01); *H04N 1/00896* (2013.01); *H04N 1/00904* (2013.01); *G06K 15/4055* (2013.01); *H04N 2201/0094* (2013.01)

(58) Field of Classification Search
CPC ................. H04N 1/00891; H04N 2201/0094
See application file for complete search history.

(56) References Cited

U.S. PATENT DOCUMENTS

| | | | |
|---|---|---|---|
| 8,780,396 B2 | 7/2014 | Toshihiro | |
| 2007/0146775 A1* | 6/2007 | Maeda | G03G 15/5004 358/1.15 |
| 2007/0240004 A1* | 10/2007 | Maeda | G06F 1/266 713/322 |
| 2011/0194148 A1 | 8/2011 | Kobayashi | |
| 2012/0287467 A1 | 11/2012 | Yamano | |
| 2013/0205156 A1* | 8/2013 | Niitsuma | G06F 1/3287 713/324 |
| 2014/0115367 A1 | 4/2014 | Soda | |

FOREIGN PATENT DOCUMENTS

| | | |
|---|---|---|
| EP | 2544085 A2 | 1/2013 |
| JP | 2003089254 A | 3/2003 |

OTHER PUBLICATIONS

Extended Search Report issued in European Appln. No. 15002804.1 mailed Mar. 24, 2016.

* cited by examiner

*Primary Examiner* — G. M. Hyder
(74) *Attorney, Agent, or Firm* — Rossi, Kimms & McDowell LLP

(57) ABSTRACT

When an image forming apparatus satisfies a condition to shift it to a power saving state, if a specific function that needs to respond to an inquiry from an external apparatus within a predetermined time is set, a power control unit shifts the image forming apparatus to a first power saving state in which power is supplied to a control unit configured to respond to the inquiry, and if the specific function is not set, shifts the image forming apparatus to a second power saving state in which no power is supplied to the control unit.

38 Claims, 18 Drawing Sheets

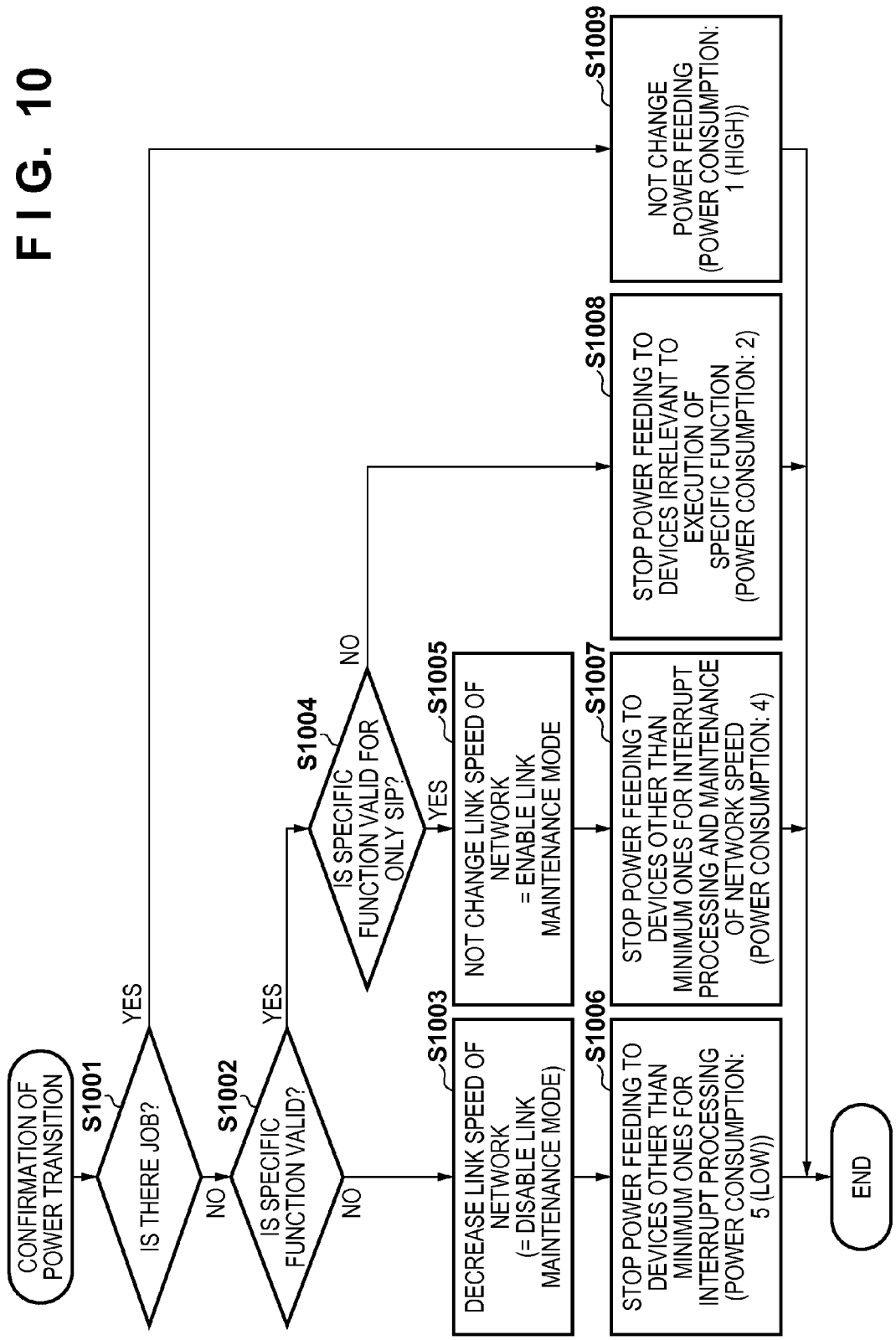

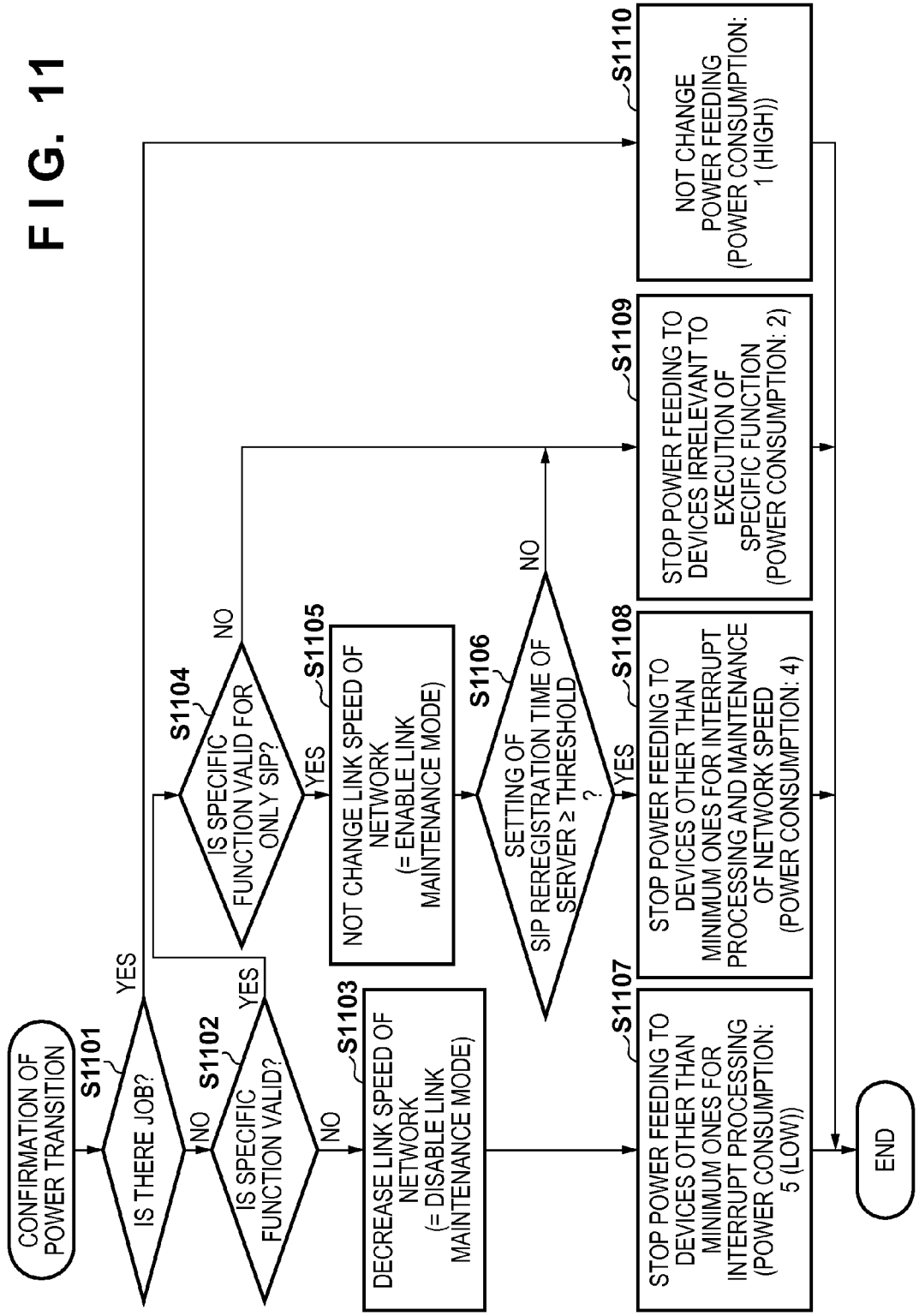

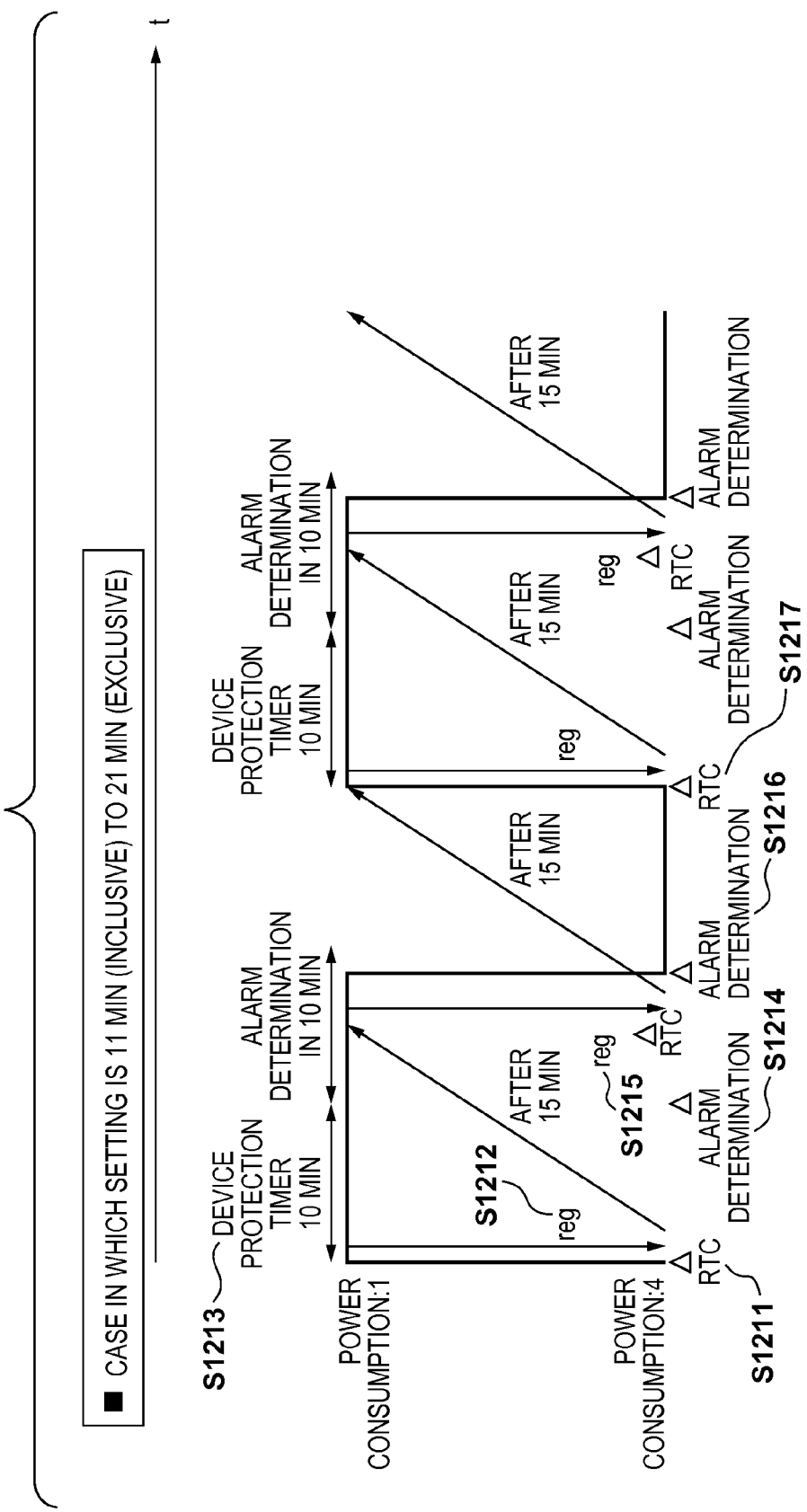

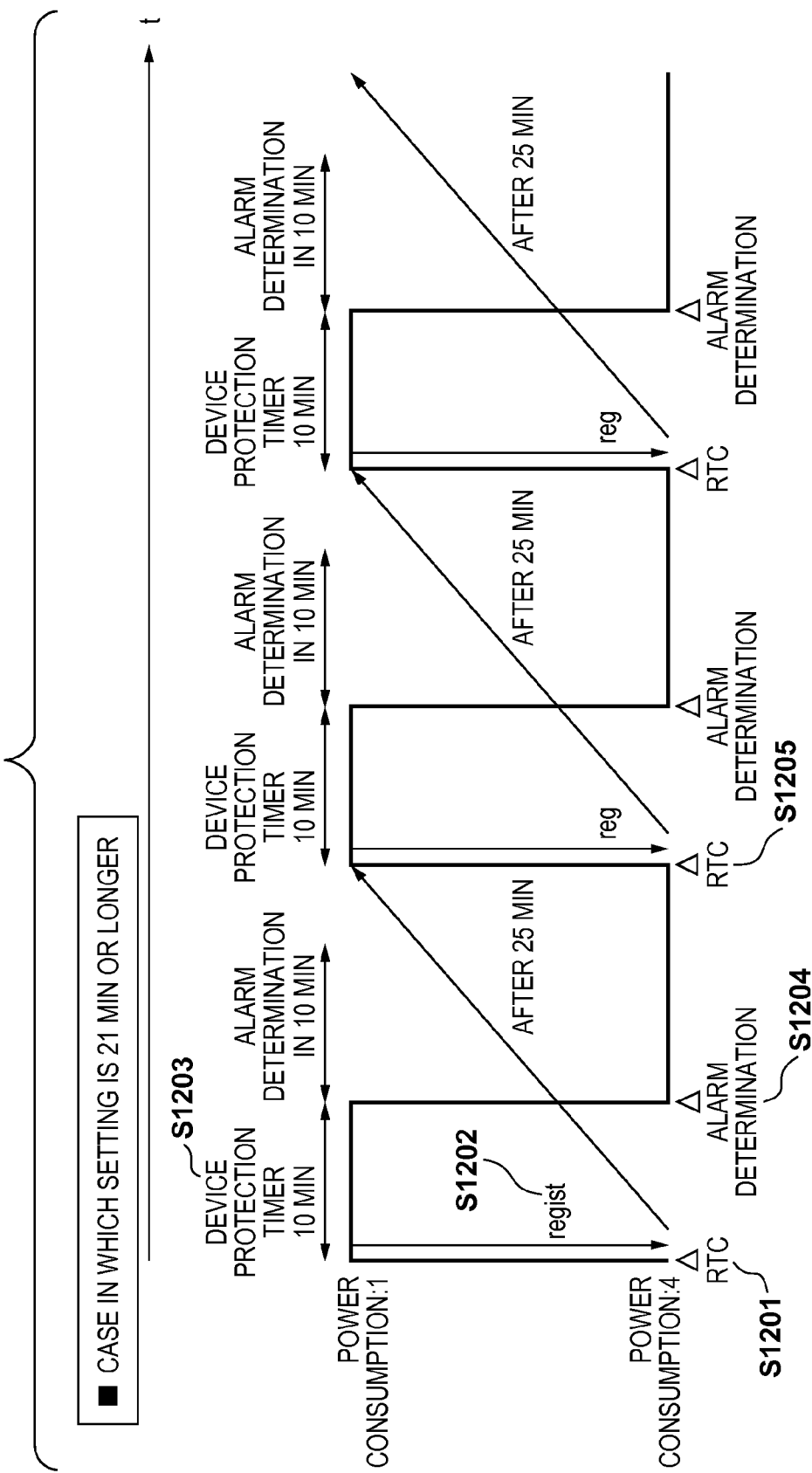

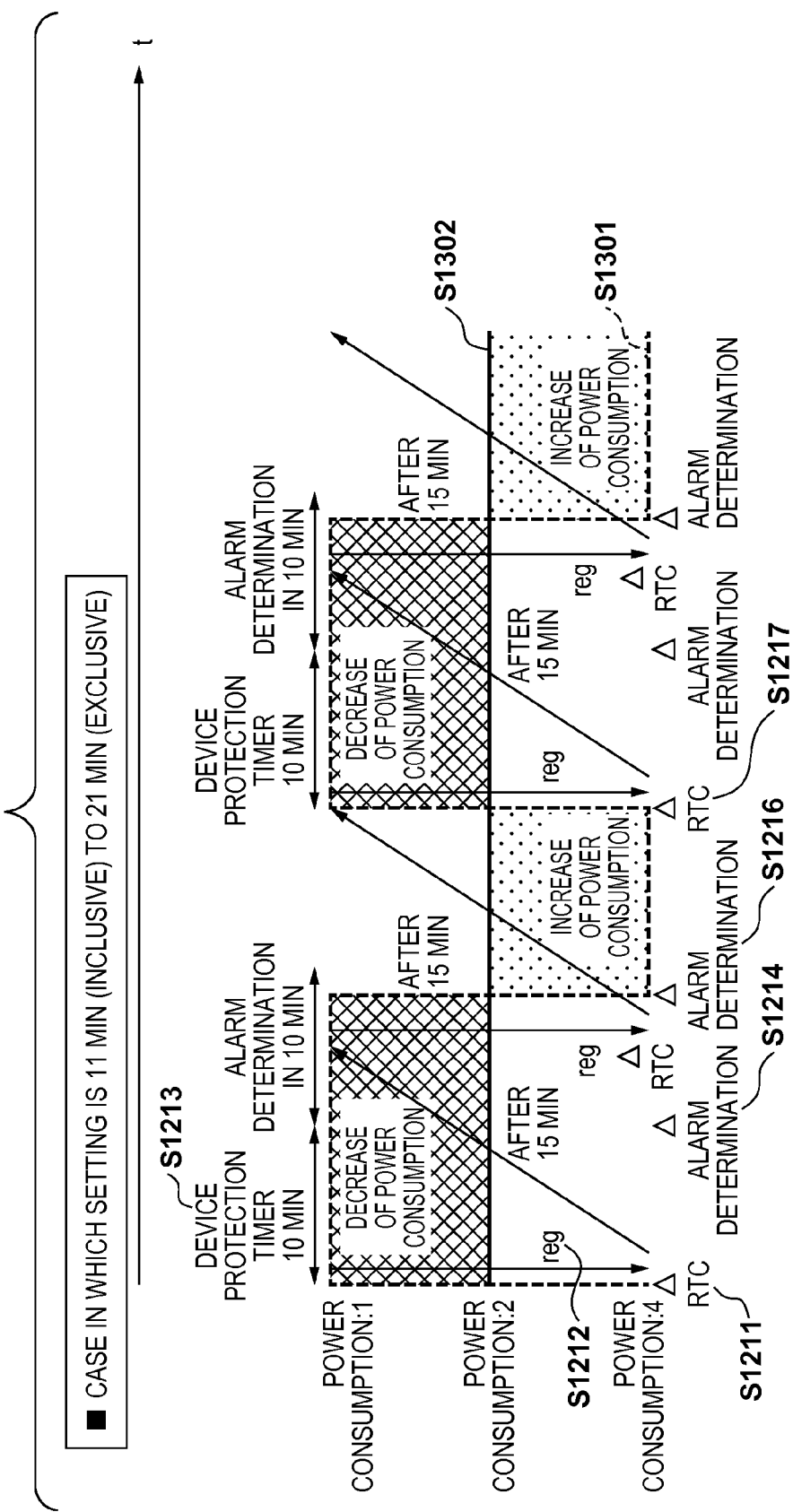

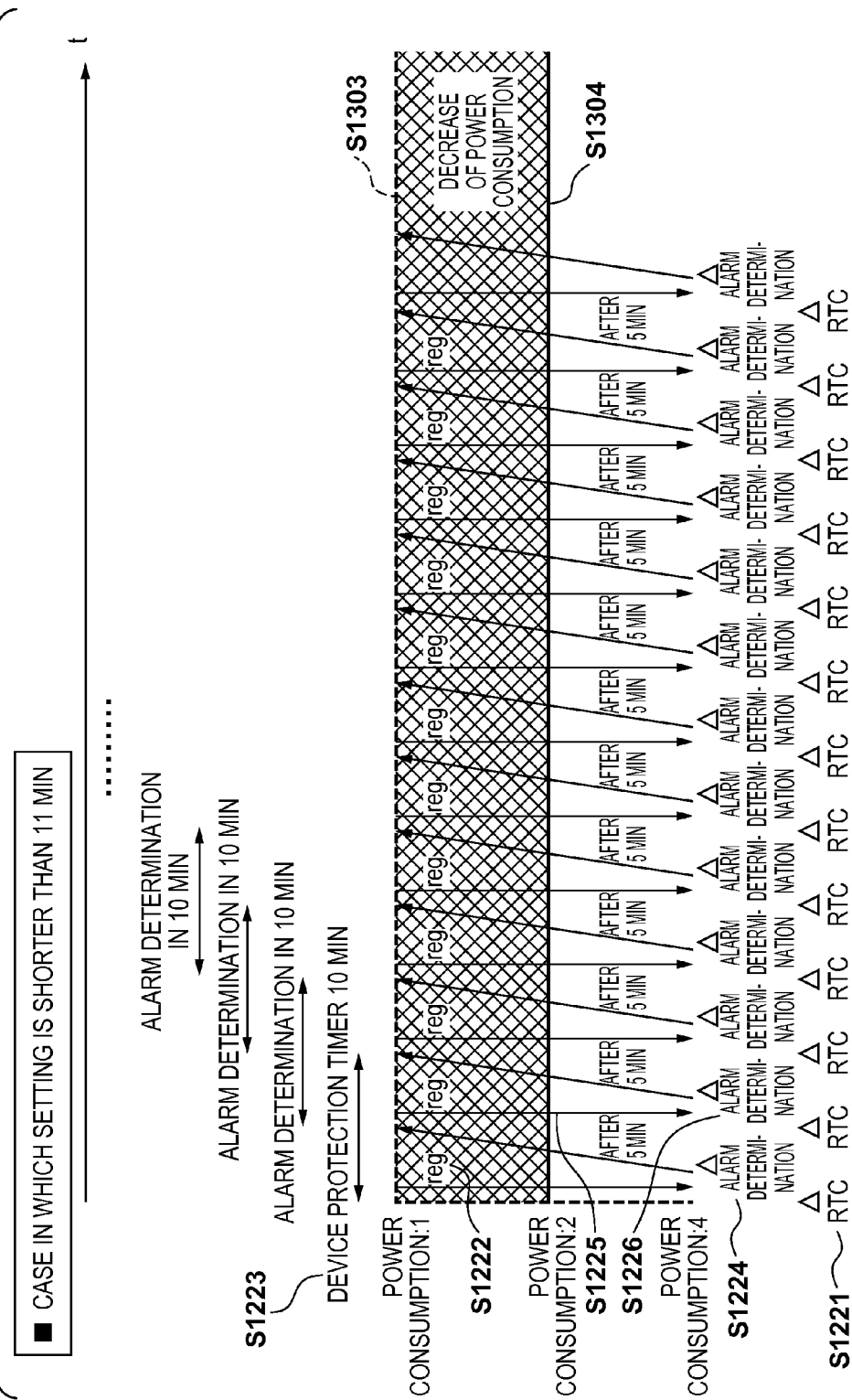

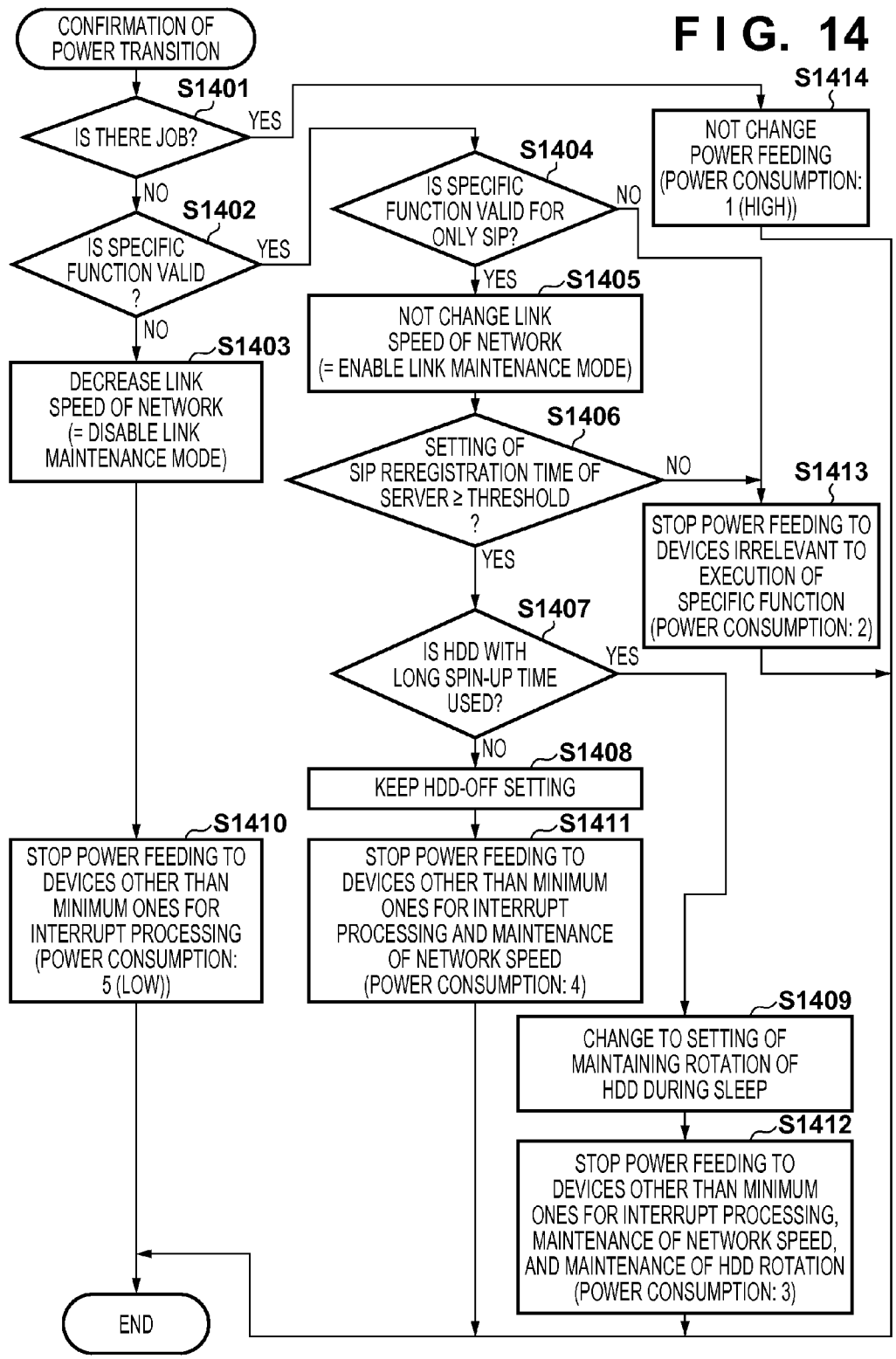

IMAGE FORMING APPARATUS THAT SHIFTS INTO DIFFERENT POWER SAVING STATES AND CONTROL METHOD THEREOF

BACKGROUND OF THE INVENTION

Field of the Invention

The present invention relates to an image forming apparatus capable of transiting to a power saving state, and a control method.

Description of the Related Art

It is becoming popular that an image forming apparatus has a function of shifting to the power saving state when, for example, the user does not operate the image forming apparatus for a predetermined time, in terms of energy saving. Various arrangements for reducing power consumption in the power saving state have been considered. In an image forming apparatus described in Japanese Patent Laid-Open No. 2003-89254, power is supplied to a controller unit that can process and store image information in the standby state, and an input/output unit that receives/outputs information from/to a network. Further, Japanese Patent Laid-Open No. 2003-89254 describes that power supply to the controller unit is stopped in the power saving state and the input/output unit is caused to transmit/receive data to/from an external apparatus, in order to reduce power consumption in the power saving state.

However, when power supply to the controller unit is stopped in the power saving state, as in Japanese Patent Laid-Open No. 2003-89254, the following is considered to occur.

A network or facsimile apparatus (input/output unit) needs to send back a response within a specific time for a request (also called "an inquiry) from a communication partner device. This is because, for example, if the image forming apparatus does not send back a response within a specific time for a request from an SIP server, the connection is canceled. The specific time is, for example, 4 seconds depending on the type of the SIP server. When returning from the power saving state in which power supply to the controller unit is stopped, the image forming apparatus requires a time of several seconds to several tens of seconds (sleep return time). When the sleep return time of the image forming apparatus is longer than the above-mentioned specific time, and if the image forming apparatus shifts to the power saving state, it cannot send back a response to the communication partner device within the specific time.

SUMMARY OF THE INVENTION

An aspect of the present invention is to eliminate the above-mentioned problems with the conventional technology. The present invention provides an image forming apparatus that is appropriately shifted to a predetermined power saving state when a predetermined function is set, and a connection method.

The present invention in one aspect provides an image forming apparatus comprising: a setting unit configured to set a specific function that needs to respond to an inquiry from an external apparatus within a predetermined time; and a power control unit configured to, when a condition to shift the image forming apparatus to a power saving state is satisfied, if the setting unit sets the specific function, shift the image forming apparatus to a first power saving state in which power is supplied to a control unit configured to respond to the inquiry, and if the setting unit does not set the specific function, shift the image forming apparatus to a second power saving state in which no power is supplied to the control unit.

The present invention in another aspect provides a control method to be executed in an image forming apparatus, comprising: a setting step of setting a specific function that needs to respond to an inquiry from an external apparatus within a predetermined time; and a power control step of, when a condition to shift the image forming apparatus to a power saving state is satisfied, and if the specific function is set in the setting step, shifting the image forming apparatus to a first power saving state in which power is supplied to a control unit configured to respond to the inquiry, and if the specific function is not set in the setting step, shifting the image forming apparatus to a second power saving state in which no power is supplied to the control unit.

According to the present invention, when a predetermined function can be executed, the image forming apparatus can be appropriately shifted to a mode in which power consumption is reduced.

Further features of the present invention will become apparent from the following description of exemplary embodiments with reference to the attached drawings.

BRIEF DESCRIPTION OF THE DRAWINGS

FIG. 10 is a flowchart showing power feeding control processing;

FIG. 11 is a flowchart showing power feeding control processing;

FIGS. 12A to 12C are timing charts showing transition of power consumption;

FIGS. 13A to 13C are other timing charts showing transition of power consumption; and FIG. 14 is a flowchart showing power feeding control processing.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present

First Embodiment

[System Arrangement]

Figure 1:
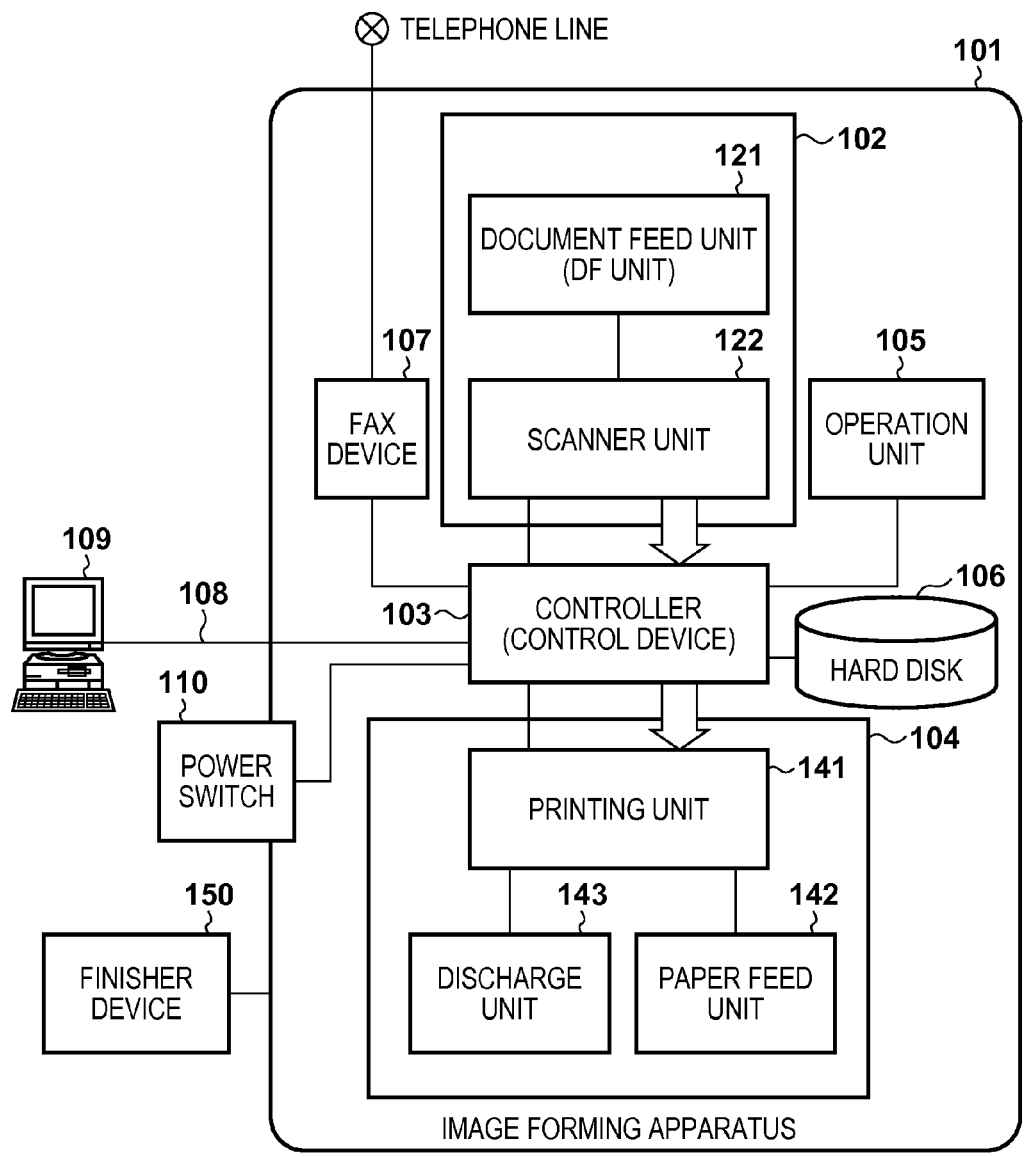
FIG. 1 is a block diagram showing an arrangement of an image forming system.

FIG. 1 is a block diagram showing the arrangement of an image forming system. In this embodiment, a so-called MFP (Multi Functional Peripheral) having a print function, scanner function, data communication function, and the like will be explained as an example of an image forming apparatus.

Referring to FIG. 1, an image forming apparatus 101 is connected to a computer 109 such as a PC via a LAN 108 so that they can communicate with each other. For example, the image forming apparatus 101 receives a job from the computer 109 via the LAN 108. In the system shown in FIG. 1, a plurality of computers may be connected to the LAN 108. A scanner device 102 optically reads a document image at a reading position on a platen glass, and converts it into digital image data (image data). A printer device 104 prints an image on a print medium (to be referred to as a sheet hereinafter) such as a sheet based on image data converted by the scanner device 102, image data received from the computer 109, or the like. An operation unit 105 includes a touch panel and hard keys for accepting a user setting operation to the image forming apparatus 101, and displaying a job processing state, an apparatus state, and the like. A hard disk (HDD) 106 stores image data, various programs, and the like. In some cases, the programs are programs for executing operations according to the following embodiments. A FAX device 107 transmits/receives image data or the like via a telephone line or the like. A controller 103 is connected to the respective modules of the scanner device 102, printer device 104, operation unit 105, hard disk 106, and FAX device 107. The controller 103 controls the respective modules to execute jobs (for example, a print job and a scan job) corresponding to the respective functions of the image forming apparatus 101.

The image forming apparatus 101 can not only receive image data from the computer 109 via the LAN 108, but also receive a job issued from the computer 109 or the like. The scanner device 102 includes a document feed unit 121 that can successively feed a bundle of documents to an image reading position, and a scanner unit 122 that optically reads an image at the reading position on the platen glass and converts it into image data. The image data converted by the scanner unit 122 is transmitted to the controller 103.

The printer device 104 includes a paper feed unit 142 capable of sequentially feeding sheets one by one from a mounted sheet bundle, a printing unit 141 for printing an image on a fed sheet, and a discharge unit 143 for discharging a printed sheet from the apparatus.

A finisher device 150 is connectable to the image forming apparatus 101. The finisher device 150 executes finishing processes such as sorting, stapling, punching, and cutting on sheets output from the discharge unit 143 of the printer device 104 of the image forming apparatus 101.

A power switch 110 is connected to the controller 103. When the power switch 110 is ON, power is fed to at least part of a power supply control unit 703 (to be described later), the operation unit 105, and a main board 300 of the controller 103. Even when the power switch 110 is OFF, power feed to each unit is not instantaneously stopped, but proper end processing of software and hardware is waited for, and then power feed to portions other than those necessary to turn on again the power switch 110, such as part of the power supply control unit 703, is stopped.

[System Functions]

An example of jobs (functions) executable by the image forming apparatus 101 will be explained.

Copy Function

The image forming apparatus 101 has a copy function of saving image data read by the scanner device 102 in the hard disk 106, and printing it on a sheet by the printer device 104.

Image Transmission Function

The image forming apparatus 101 has an image transmission function of transmitting image data read by the scanner device 102 to the computer 109 via the LAN 108.

Image Save Function

The image forming apparatus 101 has an image save function of saving image data read by the scanner device 102 in the hard disk 106, and if necessary, performing image transmission and image printing.

Image Print Function

The image forming apparatus 101 has an image print function of analyzing, for example, a page description language transmitted from the computer 109, and printing an image on a sheet by the printer device 104 based on the analysis result.

[Arrangement of Operation Unit 105]

Figure 2:
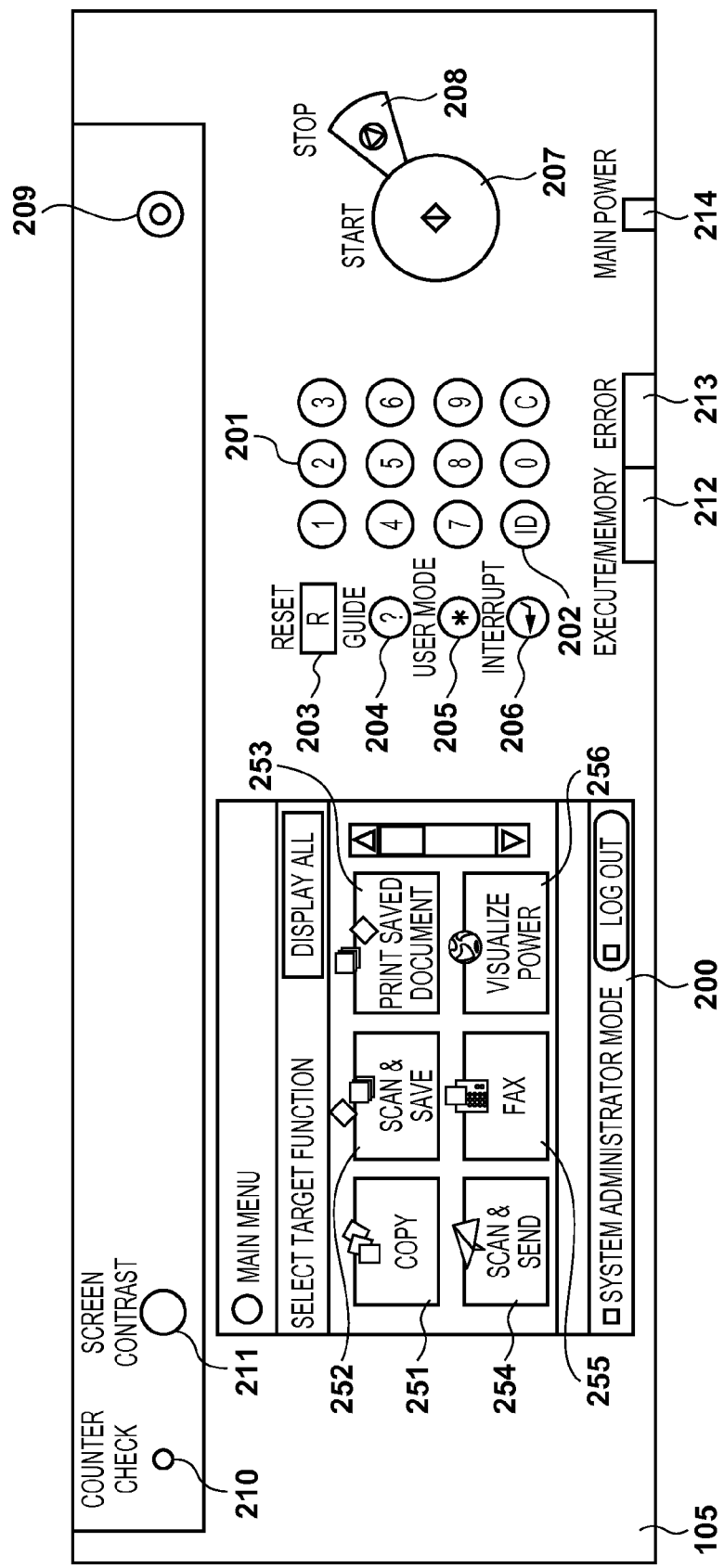
FIG. 2 is a view showing an arrangement of an operation unit.

FIG. 2 is a view showing the arrangement of the operation unit 105 in FIG. 1. Note that the operation unit 105 constituted by an LCD touch panel and the like is connected to the controller 103, and provides a user interface (I/F) for operating the system shown in FIG. 1.

Referring to FIG. 2, the setting of the operation mode of the image forming apparatus 101, display of state information of the image forming apparatus 101, and the like are performed via an LCD touch panel 200. A ten-key pad 201 includes keys indicating 0 to 9 in order to input a numerical value. An ID key 202 is used to input a department number and a password code when, for example, the image forming apparatus 101 is managed for each department. A reset key 203 is a key for resetting set contents to an initial state. A guide key 204 is a key for displaying an explanation screen for each mode. A user mode key 205 is a key for entering a user mode screen usable by a general user. An interrupt key 206 is an interrupt key for performing interrupt copying. A start key 207 is a start key for starting a copy operation. A stop key 208 is a key for stopping a copy job in execution.

When a power saving key 209 is pressed, the backlight of the LCD touch panel 200 is turned off, and the image forming apparatus 101 changes to a sleep state in which power is saved. When a counter check key 210 is pressed, a count screen that displays a total copy count used so far is displayed on the LCD touch panel 200. An adjustment key 211 is a key for adjusting the display contrast of the LCD touch panel 200.

A job LED 212 is an LED representing that a job is being executed, or image data is being accumulated in an image memory. An error LED 213 is an LED representing that the image forming apparatus 101 is in an error state, such as a paper jam or opening of a door. A power LED 214 is an LED representing that the power switch 110 of the image forming apparatus 101 is ON.

Keys 251, 252, 253, 254, 255, and 256 are software keys corresponding to respective functions executable by the image forming apparatus 101. These keys are keys for shifting to screens regarding the respective functions of copy, scan & save, printing of a saved document, scan & send, FAX, and power visualization. The key 251 is a key for transiting to the screen of the copy function. The key 252 is a key for transiting to the screen of the function of saving image data read by the scanner device 102 in the hard disk 106. The key 253 is a key for transiting to the screen of the function of printing, by the printer device 104, image data saved in the hard disk 106. The key 254 is a key for transiting to the screen of the function of sending image data read by the scanner device 102 to the computer 109 via the LAN 108. The key 255 is a key for transiting to the screen of the function of printing by the printer device 104 via the controller 103 based on data received by the FAX device 107 from a telephone line. The key 256 is a key for transiting to the screen of the function of displaying the power state of the image forming apparatus 101 on the LCD touch panel 200.

[Power Supply State 1 of Controller 103: Standby State]

The block arrangement of the controller 103 will be explained with reference to FIG. 3. The power supply state of the controller 103 in FIG. 3 will be called "power consumption 1: standby state". As for power consumption "N", a small N number indicates high power consumption.

Figure 3:
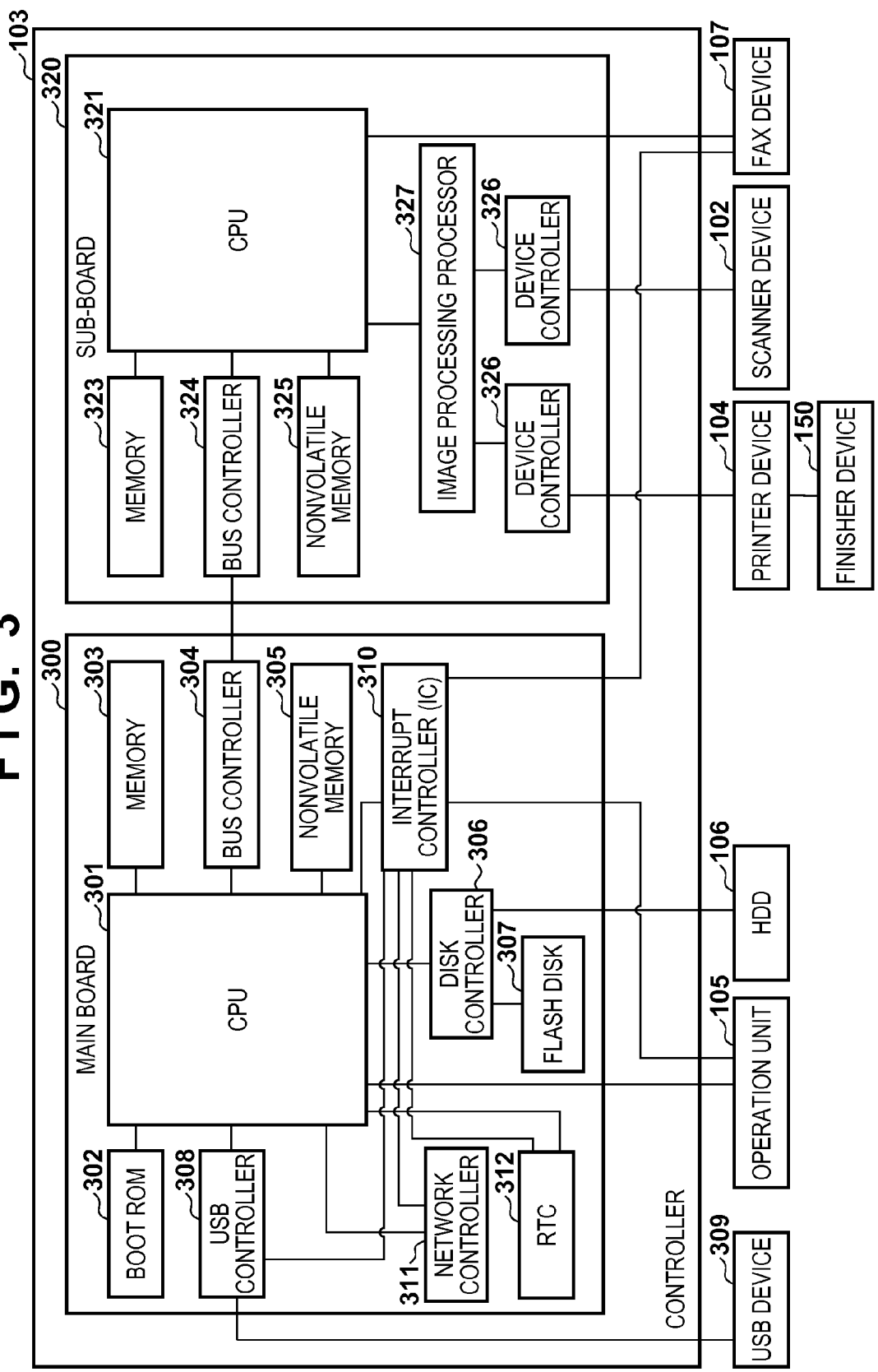
FIG. 3 is a block diagram showing an arrangement of a controller.

FIG. 3 is a block diagram showing the arrangement of the controller 103 in FIG. 1. In FIG. 3, the power supply state is the standby state, and power is supplied to all devices (modules or units). Power states in FIGS. 4 to 6 in which power consumption is lower than that in the power state shown in FIG. 3 will also be generically called a power saving state with respect to the power state shown in FIG. 3.

In FIG. 3, the controller 103 includes the main board 300 and a sub-board 320. The main board 300 is a general-purpose CPU system in the image forming apparatus 101. The main board 300 includes a CPU 301, a boot ROM 302, a memory 303, a bus controller 304, a nonvolatile memory 305, a disk controller 306, a flash disk 307, and a USB controller 308. The CPU 301 controls the overall main board 300. The boot ROM 302 stores a boot program. The memory 303 is used as the work memory of the CPU 301. The bus controller 304 has a bridge function with an external bus. The nonvolatile memory 305 is a memory in which internal data is not erased even when the power supply is turned off, and stores user data, setting data, and the like. The disk controller 306 controls a storage device such as the hard disk 106. The flash disk 307 is a relatively small-capacity storage device constituted by a semiconductor device and is, for example, an SSD (Solid State Drive). The USB controller 308 controls access to a USB device 309.

The USB device 309, the operation unit 105, and the hard disk 106 are connected to the main board 300. The USB device 309 may be either or both of a USB host and a USB device: USB devices include a USB memory, USB keyboard, USB mouse, USB-HUB, USB card reader, and a PC. The CPU 301 is connected to an interrupt controller 310. The interrupt controller 310 is connected to a network controller 311, a real-time clock (RTC) 312, the FAX device 107, the operation unit 105 which includes the power saving key 209, the USB controller 308, and the power switch 110. The interrupt controller 310 detects, for example, detection of pressing of the power saving key 209 as an interrupt, and returns the image forming apparatus 101 from the sleep state.

The sub-board 320 is constituted by a general-purpose CPU system smaller than the main board 300, and image processing hardware. The sub-board 320 includes a CPU 321, a memory 323, a bus controller 324, a nonvolatile memory 325, an image processing processor (image processor) 327, and device controllers 326. The CPU 321 controls the overall sub-board 320. The memory 323 is used as the work memory of the CPU 321. The bus controller 324 has a bridge function with an external bus. The nonvolatile memory 325 is a memory in which internal data is not erased even when the power supply is turned off, and stores user data, setting data, and the like. The image processing processor 327 executes various image processes such as data format conversion and interpolation processing.

The scanner device 102 and the printer device 104 transmit/receive image data to/from the sub-board 320 via the corresponding device controllers 326. The CPU 321 directly controls the FAX device 107. The finisher device 150 performs various finishing processes on sheets output from the printer device 104.

Note that FIG. 3 is a block diagram and is simplified. For example, the CPU 301, the CPU 321, and the like include many CPU peripheral hardware components such as a chip set, bus bridge, and clock generator, but are simplified and shown. The main board 300 and the sub-board 320 include even a general-purpose ROM and RAM, and programs for implementing operations in respective embodiments may be stored in the ROM.

The operation of the controller 103 will be explained by exemplifying the copy function. When the user designates execution of the copy function on the operation unit 105, the CPU 301 sends a document image reading instruction to the scanner device 102 via the CPU 321. The scanner device 102 optically reads the document image at the reading position on the platen glass, converts it into image data, and inputs the image data to the image processing processor 327 via the device controller 326. The image processing processor 327 performs DMA transfer to the memory 323 via the CPU 321, and temporarily saves the image data.

When the CPU 301 confirms that a predetermined amount or all of the image data has been stored in the memory 323, it sends an image output instruction to the printer device 104 via the CPU 321. The CPU 321 notifies the image processing processor 327 of the storage position (address) of the image data in the memory 323. The image data in the memory 323 is transmitted to the printer device 104 via the image processing processor 327 and the device controller 326 in accordance with a sync signal from the printer device 104. Based on the image data, the printer device 104 prints an image on a sheet. When performing printing by a plurality of copies, the CPU 301 stores image data of the memory 323 in the hard disk 106, and for the second and subsequent copies, sends the image data stored in the hard disk 106 to the printer device 104 without acquiring the image from the scanner device 102.

[Power Supply State 2 of Controller 103: Connected Sleep State]

Figure 4:
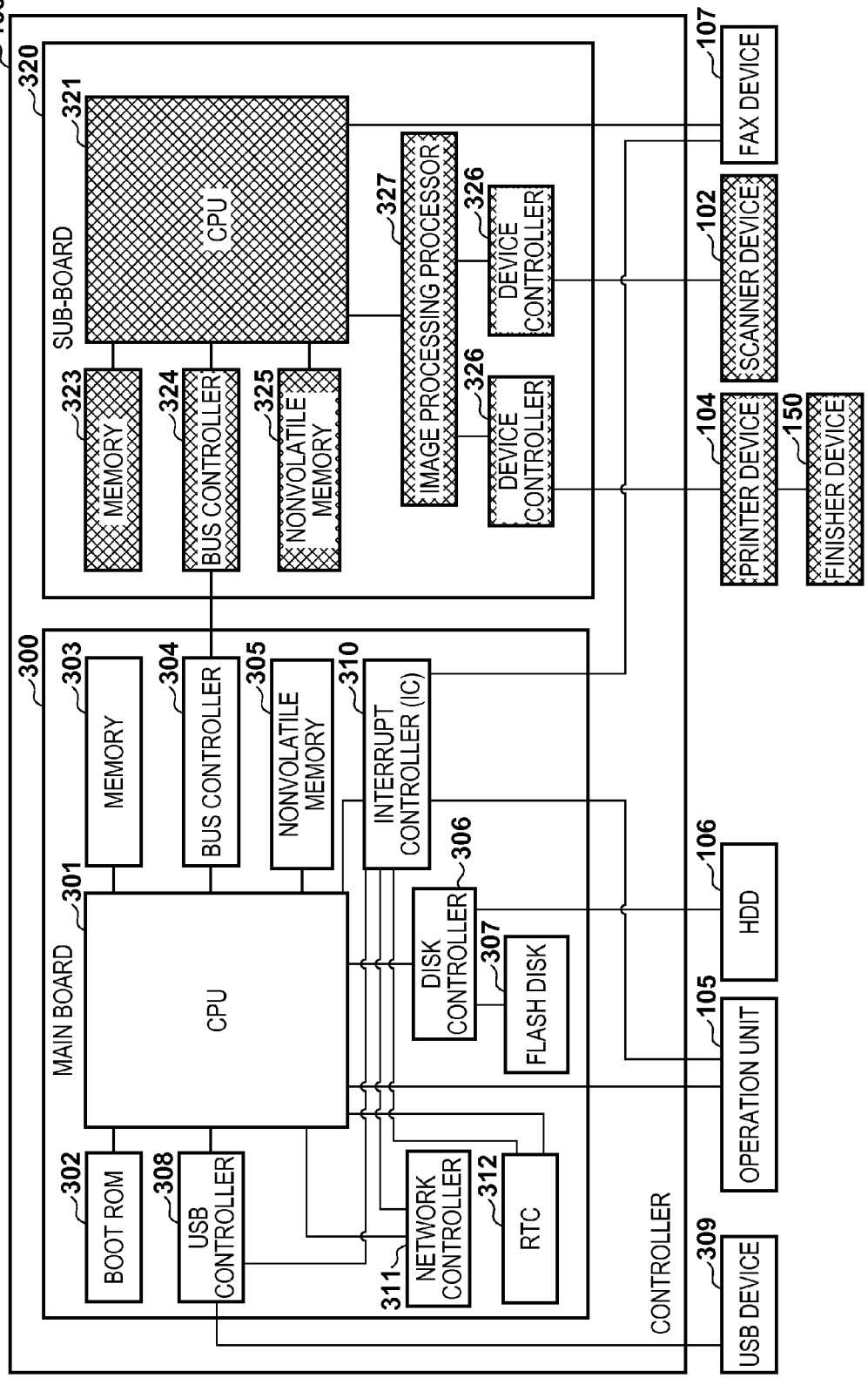
FIG. 4 is a block diagram showing a power supply state in a connected sleep state.

FIG. 4 is a block diagram showing the connected sleep state of the controller 103 in FIG. 1. The power supply state of the controller 103 in FIG. 4 is called "power consumption 2: connected sleep state". FIG. 4 is a block diagram showing a power supply state in which devices regarding execution of functions necessary for a response (network response) to a communication received from the outside via a network are energized. In FIG. 4, hatched portions represent portions to which no power is supplied. In this embodiment, the connected sleep state is a state in which the image forming apparatus 101 can execute a network transmission/reception function with an apparatus on the network while suppressing the power consumption amount. In the connected sleep state, power supply power is supplied to specific circuits, and supply of power supply power to the remaining portions is stopped. When some network functions such as the network transmission/reception function are valid and a predetermined time has elapsed in a state in which the user does not operate the image forming apparatus 101, the image forming apparatus 101 transits to the connected sleep state.

As shown in FIG. 4, no power is fed to the sub-board 320, the scanner device 102, the printer device 104, and the finisher device 150 in the connected sleep state. That is, power is fed to devices excluding the hatched portions in FIG. 4 in the connected sleep state. However, services provided by the network function change depending on the system. Thus, power supply portions in the connected sleep state are not limited to the configuration shown in FIG. 4, and power supply portions may be set in accordance with each system.

[Power Supply State 3 of Controller 103: Hard Disk Rotation Holding State]

Figure 5:
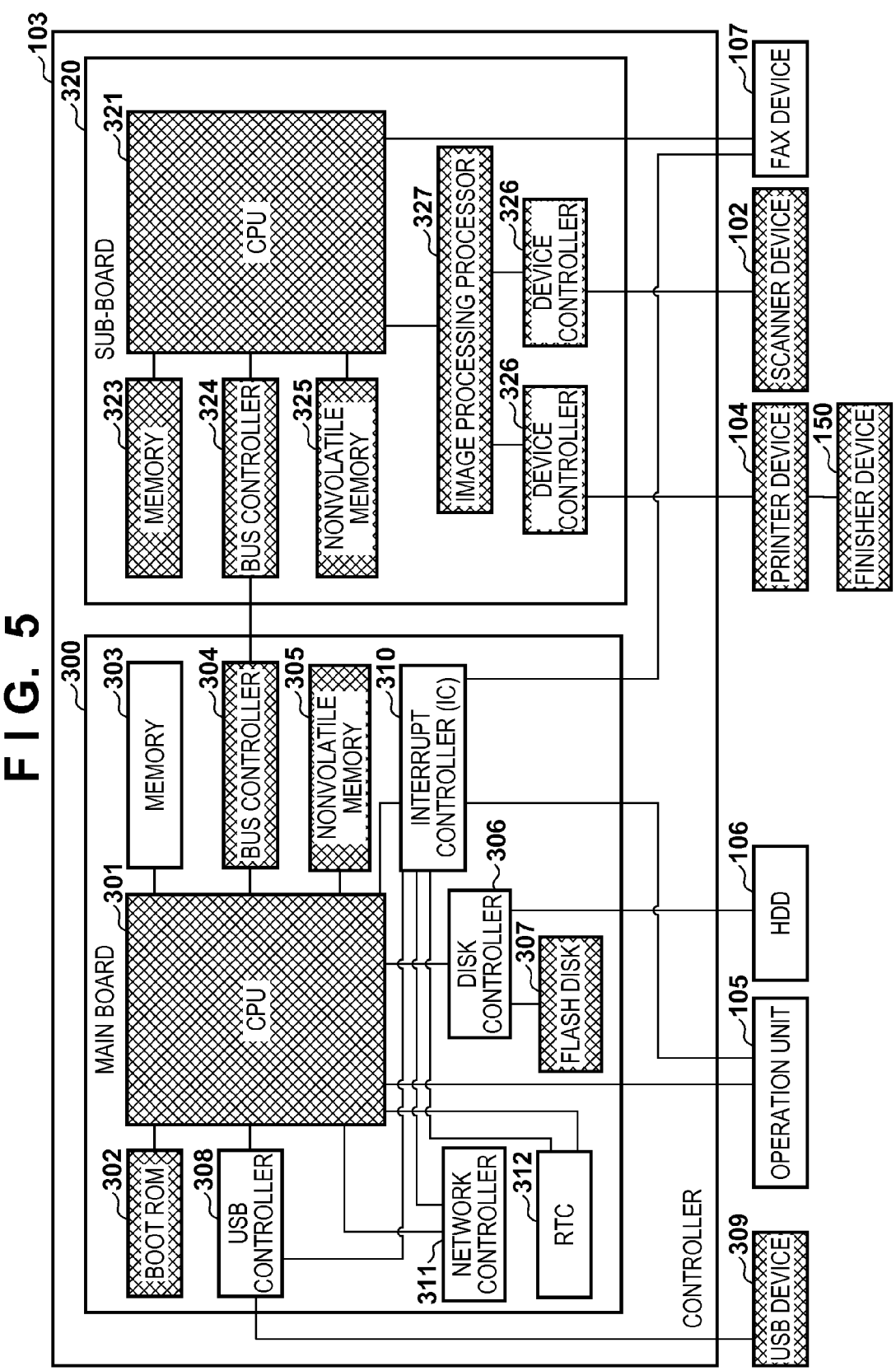
FIG. 5 is a block diagram showing a power supply state in a hard disk rotation holding state.

FIG. 5 is a block diagram showing the hard disk rotation holding state of the controller 103 in FIG. 1. The state of the controller 103 in FIG. 5 will be called "power consumption 3: hard disk rotation holding state". FIG. 5 is a block diagram showing a power supply state when the controller 103 transits to the sleep state while holding rotation of the hard disk. In FIG. 5, hatched portions represent portions to which no power is supplied. In this embodiment, the hard disk rotation holding state is a state in which the activation time can be hastened in comparison with normal activation by eliminating the rotation wait time along with spin-up of the hard disk while suppressing the power consumption amount. In the hard disk rotation holding state, power supply power is supplied to specific circuits, and supply of power supply power to the remaining portions is stopped. If the spin-up time of the hard disk 106 is longer than a predetermined time, when a predetermined time has elapsed in a state in which the user does not operate the image forming apparatus 101, or when the power saving key 209 on the operation unit 105 is pressed during power supply, the image forming apparatus 101 transits to the hard disk rotation holding state.

As shown in FIG. 5, power is fed to only minimum portions such as the memory 303 and the interrupt controller 310 in the controller 103 in the hard disk rotation holding state. For example, in the hard disk rotation holding state, the interrupt controller 310 needs to receive a sleep return interrupt, so power is fed to the memory 303, the interrupt controller 310, the network controller 311, the RTC 312, and the USB controller 308. In addition, power is fed to the power saving key 209 on the operation unit 105, part of the FAX device 107, various sensors, and the power switch 110. To hold the rotation of the hard disk, power is fed to the disk controller (driving control unit) 306 and the hard disk 106. That is, in the hard disk rotation holding state, power is fed to devices excluding the hatched portions in FIG. 5.

In the hard disk rotation holding state, the interrupt controller 310 receives the following one or more interrupts. More specifically, the interrupt controller 310 receives one or more interrupts out of a network incoming call, the RTC that detects a timer or alarm, the FAX that detects an incoming call or off-hook, the power saving key 209, sensor detection, the USB that detects insertion/removal or communication, and the power switch 110. Upon receiving an interrupt, the interrupt controller 310 notifies the CPU 301 of the cause of the interrupt. Upon receiving the notification, the CPU 301 performs processing of returning the state of power feeding or software to a normal state. However, the sleep return factor changes depending on the system. Thus, power supply portions in the hard disk rotation holding state are not limited to the configuration shown in FIG. 5, and power supply portions may be set in accordance with each system.

[Power Supply State 4 of Controller 103: Sleep State by Link Maintenance Mode and Sleep State]

Figure 6:
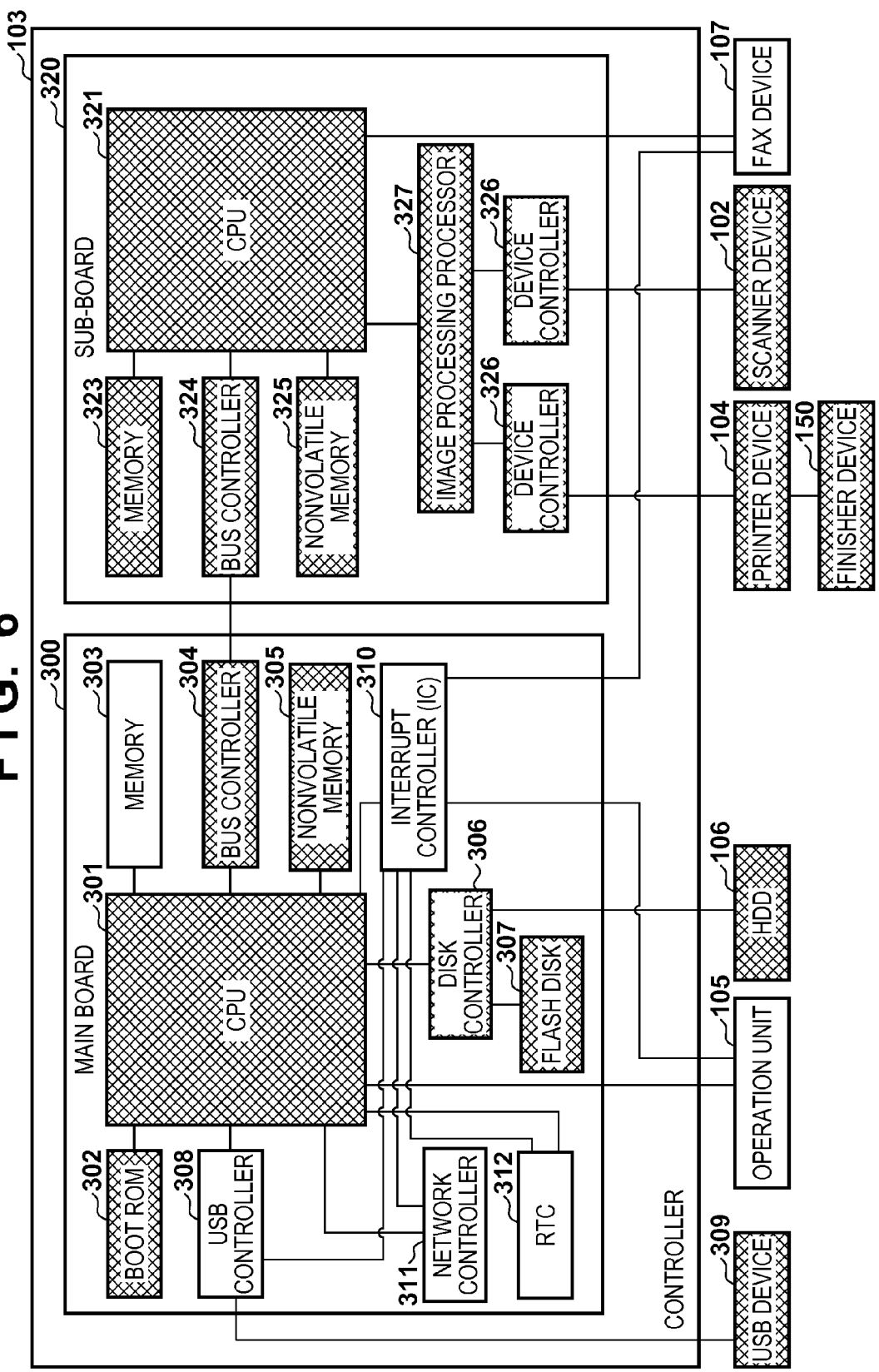
FIG. 6 is a block diagram showing a power supply state in a link maintenance mode.

FIG. 6 is a block diagram showing the sleep state of the controller 103 in FIG. 1 by the link maintenance mode, and the sleep state. The power supply state of the controller 103 in FIG. 6 will be called "power consumption 4: link maintenance state" or "power consumption 5: sleep state".

The difference between the link maintenance state and the sleep state will be explained. The link maintenance state is a case in which the image forming apparatus transits to the sleep state while maintaining the communication speed (link speed) with the network. The sleep state is a case in which the link speed is decreased to reduce power consumption and the image forming apparatus transits to the sleep state. That is, power consumption can be reduced in the sleep state much more than in the link maintenance state. To the contrary, the sleep return time can be hastened in the link maintenance state much more than in the sleep state because the link speed need not be changed before and after transition to the sleep state.

In the link maintenance state, the power consumption of the network controller 311 is higher than in the sleep mode. To the contrary, in the sleep state, the power consumption of the network controller 311 is lower than in the link maintenance state because power supply to the communication control portion that controls the link speed is stopped. That is, the link maintenance state and the sleep state are the same in terms of supplying power to the network controller 311, and are represented in the same way in FIG. 6.

Hatched portions in FIG. 6 represent that no power is supplied. In this embodiment, the link maintenance state is a state in which the return time can be hastened in comparison with the return time in the sleep state while suppressing the power consumption amount. In the link maintenance state and the sleep state, power supply power is supplied to specific circuits, and supply of power supply power to the remaining portions is stopped. For example, when a predetermined time has elapsed in a state in which the user does not operate the image forming apparatus 101, or when the power saving key 209 on the operation unit 105 is pressed during power supply, the image forming apparatus 101 transits to the link maintenance state or the sleep state.

In the sleep state, power is supplied to only minimum portions such as the memory 303 and the interrupt controller 310 in the controller 103. For example, in the sleep state, power is supplied to portions at which the interrupt controller 310 receives an interrupt for sleep return. That is, power is supplied to devices other than the hatched portions, such as the network controller 311, the RTC 312, the USB controller 308, the power saving key 209 on the operation unit 105, various sensors, part of the FAX device 107, and the power switch 110.

In the link maintenance state or the sleep state, the interrupt controller 310 receives the following one or more interrupts. More specifically, the interrupt controller 310 receives one or more interrupts out of a network incoming call, the RTC that detects a timer or alarm, the FAX that detects an incoming call or off-hook, the power saving key 209, sensor detection, the USB that detects insertion/removal or communication, and the power switch 110. Upon receiving an interrupt, the interrupt controller 310 notifies the CPU 301 of the cause of the interrupt. Upon receiving the notification, the CPU 301 performs processing of returning the state of power feeding or software to a normal state. However, the sleep return factor changes depending on the system. Thus, power supply portions in the sleep state are not limited to the configuration shown in FIG. 6, and power supply portions may be set in accordance with each system.

[Power Supply Arrangement]

Figure 7:
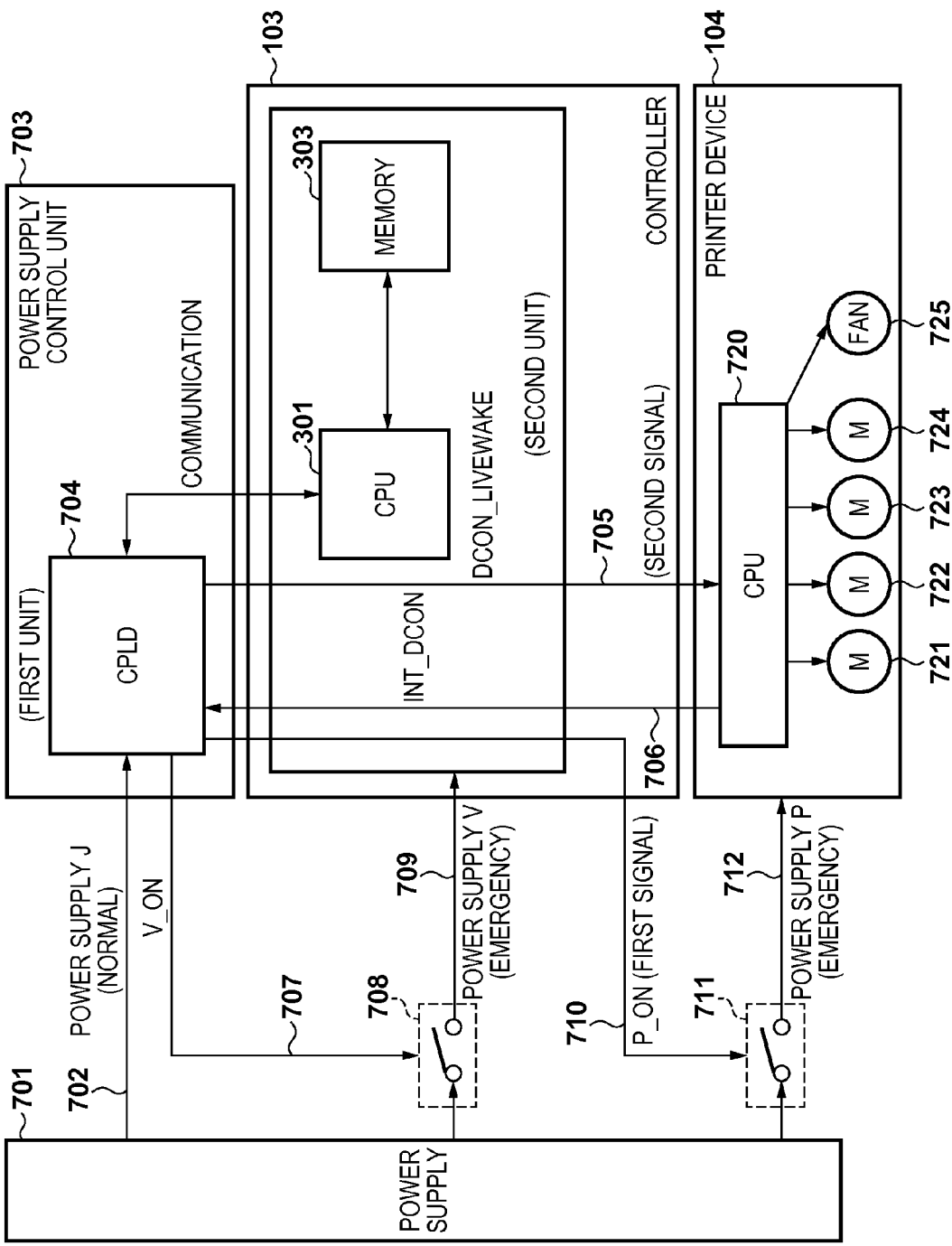
FIG. 7 is a block diagram showing an arrangement for power supply control of the image forming apparatus.

FIG. 7 is a block diagram showing an arrangement regarding power supply control of the image forming apparatus 101. The arrangement of the controller 103, the printer device 104, the power supply control unit 703, and a power supply 701 in the image forming apparatus 101 will be explained with reference to FIG. 7. In FIG. 7, power is always supplied to the power supply control unit 703 via a power supply line J 702 serving as the first power supply line. Since power consumption remains low, power control is performed to energize only the power supply control unit 703 when the power supply of the image forming apparatus 101 is OFF.

A CPLD (Complex Programmable Logic Device) 704 is programmed in advance to execute the following predetermined operation. More specifically, a relay switch 708 is switched in accordance with an IO signal V_ON 707 serving as the first power supply control signal, and power supply to the controller 103 from the power supply 701 via a power supply line V 709 serving as the second power supply line is controlled. The CPU 301 sets a plurality of timer values, and at the time of timer activation, a timer operation is executed based on a timer value set by the CPU 301.

In addition, a relay switch 711 is switched in accordance with an IO signal P_ON 710 serving as the second power supply control signal, and power supply to the printer device 104 from the power supply 701 via a power supply line P 712 serving as the third power supply line is controlled. The CPU 301 controls predetermined IO signals. The control target IO signals include a DCON_LIVEWAKE signal 705 connected to a CPU 720 of the printer device 104. When power is supplied to the printer device 104 in a state in which the signal is asserted, the printer device 104 controls movable portions and quietly returns without performing specific operations that consume large power. The specific operations include control operations such as the rotation operation of the motor, roller, polygon mirror, and the like, temperature control of drums 721, 722, 723, and 724, and exhaust heat processing by a fan 725. Power supply control is also possible from the CPLD 704 for the scanner device 102 as for the printer device 104, and a repetitive description thereof is omitted. That is, as for the scanner device 102, the same power supply control as that for the printer device 104 is performed from the CPLD 704.

Note that power supply to each block as shown in FIG. 7 may be implemented by, for example, an arrangement in which the relay switch 708 is constituted by two systems, and in the power saving state such as the sleep state, only a relay switch connected to a block to be turned off is turned off, and the other relay switch is kept on. In a shutdown state in which the power switch 110 is turned off, the relay switches of the two systems are turned off. In this case, the power supply control signal is not a binary control signal but a multi-value control signal corresponding to an energization state. The above-described power supply states including the sleep state and the shutdown state are implemented by the control arrangement as shown in FIG. 7.

[Power Supply Monitoring 1 of Power Supply Control Unit 703: Power Feeding in Activation]

Power supply control in activation processing of the image forming apparatus 101 will be explained. When the operator (user) uses the image forming apparatus 101, he turns on (power on) the power switch 110. Then, the power supply control unit 703 detects power-on from the power supply line J 702, and controls to turn on the relay switches 708 and 711 by using the power supply switch control signals 707 and 710 and supply power supply power from the power supply 701 to the whole image forming apparatus 101. The power supply control unit 703 performs power supply corresponding to the power-on state to the whole image forming apparatus 101. For example, the power supply control unit 703 supplies power to the controller 103, the printer device 104, and the scanner device 102 via respective DC power supply paths. In the printer device 104 and the scanner device 102, their CPUs start an initialization operation upon power-on.

After power is supplied, the CPU 301 of the controller 103 performs hardware initialization. The hardware initialization includes, for example, register initialization, interrupt initialization, registration of a device driver at the time of kernel activation, and initialization of the operation unit 105. Then, the CPU 301 of the controller 103 performs software initialization. The software initialization includes, for example, calling of an initialization routine of each library, activation of a process and thread, activation of software for communicating with the printer device 104 and the scanner device 102, and drawing of the operation unit 105. After these activation operations, the controller 103 of the image forming apparatus 101 shifts to the standby state in FIG. 3.

[Power Supply Monitoring 2 of Power Supply Control Unit 703: Power Feeding in Normal State]

Next, power supply control in a normal state in which the user does not use the printer device 104 and scanner device 102 of the image forming apparatus 101 will be explained. The normal state is not only a state in which power is fed to all units, but also includes even a case in which no power is supplied to the printer device 104 when printing is not executed, and a case in which no power is supplied to the scanner device 102 when the operation unit 105 is not lighted and it is recognized that the user is absent in front of the image forming apparatus 101. The normal state also includes a case in which power is supplied to hasten the completion of printing by the printer device 104 or the completion of reading by the scanner device 102. Such a case is a so-called operation standby state such as a state in which none of the motor and polygon mirror for printing is operated, a state in which temperature control of the transfer unit for printing is not performed, or a state in which home position detection for reading is not performed.

[Power Supply Monitoring 3 of Power Supply Control Unit 703: Power Feeding in PDL Printing]

Next, power supply control in a state in which the printer device 104 and the scanner device 102 are used in the PDL printing state in the image forming apparatus 101 will be explained. Power-on and power-off of the printer device 104 when executing the image print function will be described.

The CPU 301 of the controller 103 receives data from the computer 109 via the LAN 108, and stores it in the memory 303. The CPU 301 analyzes the received data, and when executing the image print function, generates a print job.

The CPU 301 notifies the CPLD 704, switches the relay switch 711 by using the power supply control signal 710, and controls to supply power to the printer device 104 from the power supply 701 via the power supply line P 712. When the printer device 104 becomes available, the CPU 301 executes the print job. The CPU 301 transmits the data from the memory 303 to the CPU 321 of the sub-board 320 via the bus controller 304 and the bus controller 324 of the sub-board 320. The data is further transmitted to the printer device 104 via the image processing processor 327 and the device controller 326. The printer device 104 executes printing based on the received data, and after the completion of printing, notifies the CPU 301 of the processing result. After the completion of printing, the CPU 301 controls the power supply control unit 703, turns off the relay switch 711 by using the power supply control signal 710, and turns off the power supply of the printer device 104.

[Power Supply Monitoring 4 of Power Supply Control Unit 703: Power Feeding in Sleep Shift]

Next, sleep shift processing of the controller 103 will be explained. When the standby state in which the user does not use the image forming apparatus 101 continues for a predetermined time, the CPU 301 controls to transit the image forming apparatus 101 to the sleep state. The CPU 301 notifies the power supply control unit 703 of the shift to the sleep state, and changes power feeding to the controller 103 to be one as described with reference to the block diagram of the controller 103 in the sleep state shown in FIG. 6. As described above, power feeding to each block as shown in FIG. 6 may be implemented by, for example, an arrangement in which the relay switch 708 is constituted by two systems, and in the sleep state, only a relay switch connected to a block to be turned off is turned off, and the other relay switch is kept on.

[Power Supply Monitoring 5 of Power Supply Control Unit 703: Power Feeding in Power Saving State]

Next, power supply control of the image forming apparatus 101 in the power saving state will be explained. When a predetermined time has elapsed in a state in which the user does not operate the image forming apparatus 101, when the power saving key 209 on the operation unit 105 is pressed, or when a preset time has come, the image forming apparatus 101 transits to the power saving state. For example, in the sleep state, power is supplied to the memory 303, interrupt controller 310, network controller 311, RTC 312, and USB controller 308 of the controller 103, and the like. Power is also supplied to the power saving key 209 of the operation unit 105, part of the FAX device 107, various sensors, and the like. However, the sleep return factor changes depending on the system, so power supply portions in the sleep state are set in accordance with the system.

The operation of software at the time of sleep return will be described. During sleep, the interrupt controller 310 detects one or more interrupts out of a network, the RTC that detects a timer or alarm, the FAX that detects an incoming call or off-hook, a software switch, various sensors, and the USB that detects insertion/removal or communication. The interrupt controller 310 notifies the CPU 301 of the cause of the interrupt. Upon receiving the notification, the CPU 301 performs sleep return processing of returning the state of power feeding or software to a normal state.

[Power Supply Monitoring 6 of Power Supply Control Unit 703: Power Feeding in Sleep Return]

Power supply control of the controller 103 at the time of sleep return will be explained. For example, when the interrupt controller 310 detects a pressing event of the power saving key 209, which is a sleep return factor, during the power saving state, the CPU 301 performs sleep return. The CPU 301 notifies the power supply control unit 703 of the sleep return. Then, the power supply control unit 703 turns on the relay switches 708 and 711 by using the power supply switch control signals 707 and 710. As a result, power is supplied to the controller 103, the printer device 104, and the scanner device 102. Although FIG. 7 does not show a power supply control signal to the scanner device 102, the power supply control signal may be shared with the printer device 104 or prepared as another signal (not shown).

After the end of the print job, the CPU 301 controls to transit the image forming apparatus 101 to the power saving state again. The CPU 301 notifies the power supply control unit 703 of the shift to the power saving state. The power supply control unit 703 turns off the relay switch 711 by using the power supply control signal 710, and stops power feeding to portions other than the controller 103.

A case in which a network reception event, which is a sleep return factor, is generated during the power saving state will be described. Upon receiving the sleep return factor, the power supply control unit 703 turns on the relay switch 708 by using the power supply control signal 707, and supplies power to the controller 103. In response to this, the CPU 301 performs sleep return. When no job has been generated or when device information need not be acquired, no power need be supplied to the printer device 104 and the scanner device 102.

[Power Supply Control Sequence]

In this embodiment, when a job to be executed does not exist and a specific function, for which execution is limited depending on the power state, is permitted (is valid) in the image forming apparatus 101, power supply to devices irrelevant to the provision of this specific function is stopped to transit the image forming apparatus 101 to the power saving state.

Figure 8:
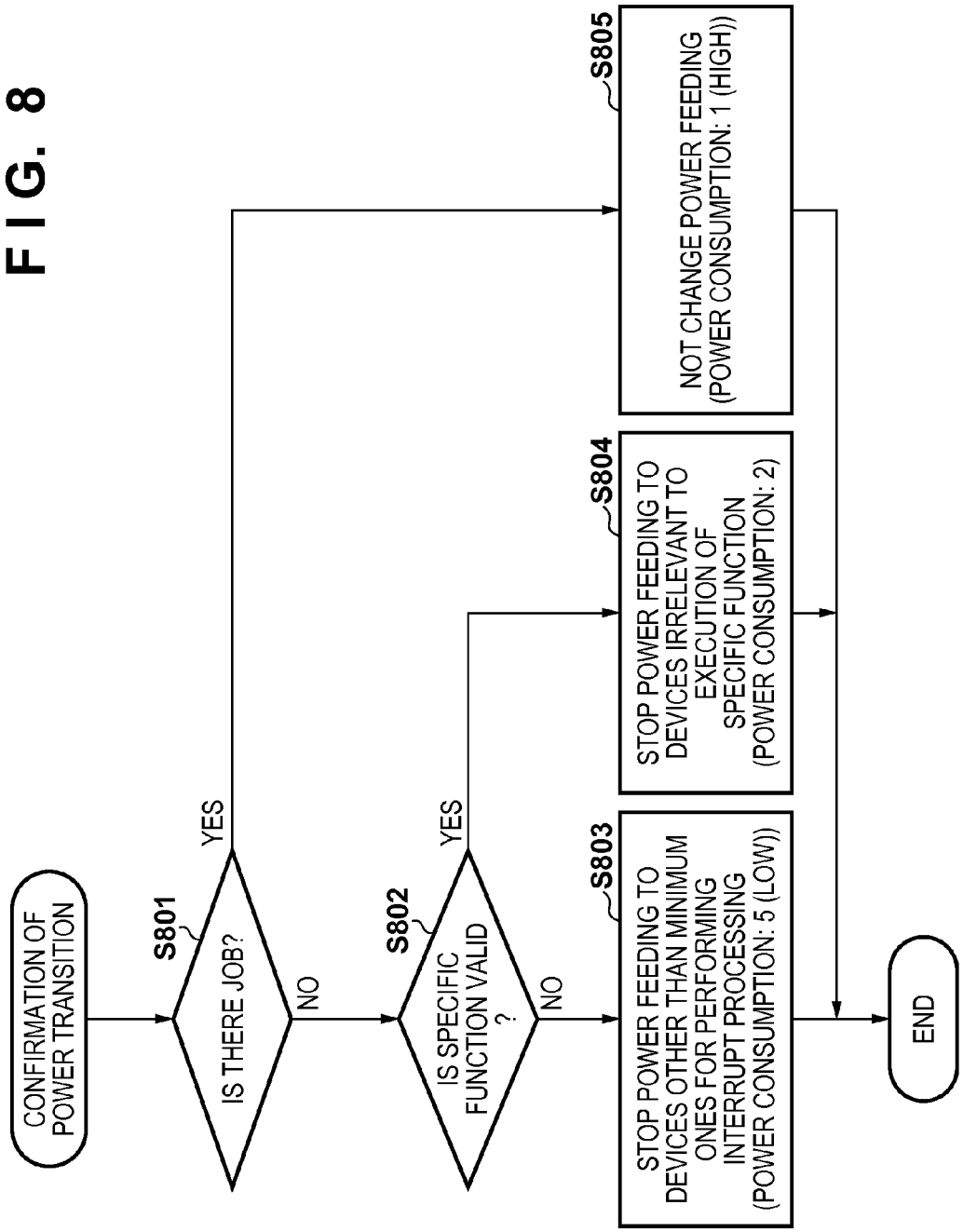
FIG. 8 is a flowchart showing power feeding control processing.

FIG. 8 is a flowchart showing the procedures of power feeding control processing according to this embodiment. Each processing in FIG. 8 is implemented by, for example, reading out a program loaded to the memory 303 and executing it by the CPU 301.

In step S801, the CPU 301 determines whether there is a job in execution at the time of confirming power state transition. If the CPU 301 determines that there is a job in execution, it maintains the current power supply state in step S805. The power supply state in step S805 will be defined as "power consumption 1: standby state". If the CPU 301 determines that there is no job in execution, it determines, in step S802 based on setting information (to be described later) stored in the memory 303, the hard disk 106, or the like, whether specific functions are valid.

If the CPU 301 determines in step S802 that at least one specific function is valid, it stops power supply to devices irrelevant of execution of the specific function in step S804. The power state in step S804 will be defined as "power consumption 2: connected sleep state". If all the specific functions are invalid (are inhibited), the CPU 301 stops power supply to devices other than minimum ones for performing interrupt processing in step S803. The power state in step S803 will be defined as "power consumption 5: deep sleep state".

Jobs will be explained. A job in this embodiment is one processing to be executed by the image forming apparatus, and transition (step S803 or S804) to the power saving state is not executed during execution of the job. Jobs include, for example, jobs for performing printing, scanning, backup & restoration of user data, server notification of information of the image forming apparatus 101, and setting change of the scanner device 102, the printer device 104, and the finisher device 150 via the network. Jobs associated with the facsimile are, for example, jobs in transmission reservation, in wait for printing, during transfer, during telephone conversation, during communication, in appointed-time transmission, and during relay. Even a predetermined period after line disconnection, connection of an ISDN board, connection of a multiple-line FAX board, and the like are also handled as jobs. Jobs may include jobs other than the above-mentioned ones.

Specific functions will be explained. The specific functions include partial functions of the network, facsimile, and the like, and execution of these functions has a restriction in terms of the response time, the reception function, the transmission function, and power shortage. Table 1 is a list describing the correspondence (association) between a specific function and devices to be used.

TABLE 1

|  | Restriction | CPU, MEMORY | HDD | NIC | FAX-CCU |
|---|---|---|---|---|---|
| SIP (IP-FAX In NGN Environment) | Response time | Necessary | Necessary | Necessary | Unnecessary |
| Multicast DNS (mDNS) | Response time | Necessary | Necessary | Necessary | Unnecessary |
| Modem Dial-in | Response time | Necessary | Necessary | Unnecessary | Necessary |
| Caller ID Display | Response time | Necessary | Necessary | Unnecessary | Necessary |
| BMLinkS | Reception function | Necessary | Necessary | Necessary | Unnecessary |
| IEEE802.1X | Reception function | Necessary | Necessary | Necessary | Unnecessary |
| AutoIP | Reception function | Necessary | Necessary | Necessary | Unnecessary |
| NetWare | Transmission function | Necessary | Necessary | Necessary | Unnecessary |
| AppleTalk | Transmission function | Necessary | Necessary | Necessary | Unnecessary |
| Facsimile Fixed Reception | Power shortage | Necessary | Necessary | Unnecessary | Necessary |
| Facsimile Incoming Call Ringing | Power shortage | Necessary | Necessary | Unnecessary | Necessary |
| Facsimile Remote Reception | Power shortage | Necessary | Necessary | Unnecessary | Necessary |

Functions having a restriction on the response time are, for example, SIP (Session Initiation Protocol), IPv4/6 multicast DNS (mDNS), model dial-in, and caller ID display. These functions need to send back a response within a specific time (unit: seconds) to a request from another apparatus on the network. For example, when the minimum specific time is 3 seconds to 6 seconds and the time of return from the sleep state is 4 seconds to 10 seconds or more, even if the image forming apparatus 101 receives a request, it cannot send back a response within the specific time.

Functions having a restriction on the reception function are, for example, BMLinkS, IEEE802.1X, and AutoIP. Details of the restriction differ between these functions. For example, for BMLinkS, a plurality of response patterns exist and are complicated. For IEEE802.1X, password authentication is necessary. AutoIP is a function of permitting a free IP, and whether to send back a response is determined in accordance with the time from the first packet to the second packet. These functions require complicated protocol analysis, password authentication, and the like, and it is difficult to execute these functions in the sleep state in which no power is supplied to the CPU of the controller unit.

Functions having a restriction on the transmission function are, for example, Netware and AppleTalk. For these functions, terminal registration in the server or the like needs to be performed periodically for search from another client terminal. It is therefore difficult to execute even these functions in the sleep state in which no power is supplied to the CPU of the controller unit.

Functions having a restriction on power shortage are, for example, facsimile fixed reception, facsimile incoming call ringing, and facsimile remote reception. These functions are functions of the telephone system, power is insufficient in the sleep state, and these functions cannot be executed. An example of a function of the telephone system is a so-called incoming call ringing function of setting the ringing count of a bell and ringing the bell by the designated count upon receiving a line incoming call. When the image forming apparatus 101 receives an incoming call in the sleep state, the telephone rings before sleep return of the image forming apparatus 101 because power is fed to a handset (telephone). As a result, the image forming apparatus 101 cannot count the ringing count of the telephone.

Specific functions in this embodiment are not limited to the above-described functions, and a function, execution of which is limited by, for example, the sleep return time, is handled as a specific function.

Figure 9:
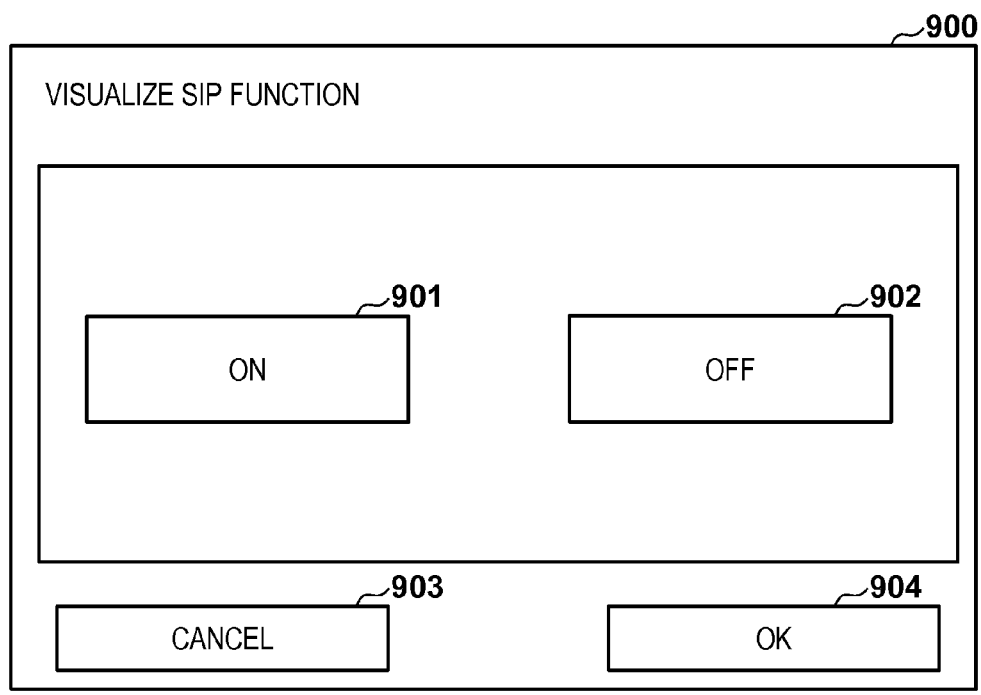
FIG. 9 is a view showing a screen for permitting a specific function.

FIG. 9 shows a screen that is displayed on the LCD touch panel 200 in order to validate the SIP function. When the user presses a button 901 and an OK button 904 on a setting screen 900, the image forming apparatus 101 validates the SIP function. At this time, the CPU 301 stores, in the storage area such as the memory 303 of the image forming apparatus 101, setting information representing that the SIP function is valid.

When the user presses a button 902 and the OK button 904, the image forming apparatus 101 invalidates the SIP function. At this time, the CPU 301 stores, in the storage area such as the memory 303 of the image forming apparatus 101, setting information representing that the SIP function is invalid. When the user presses the button 901 or 902 on the setting screen 900, the highlight is inverted. At this time, if the user presses a cancel button 903, the inversion of the highlight is canceled. The setting screen 900 shown in FIG. 9 is represented as a user interface screen for validating the SIP function, but may be displayed for each specific function described above.

The processing in FIG. 8 will be described in detail below. Here, a case in which mDNS and caller ID display are set to be valid will be explained. The processing in FIG. 8 starts when a facsimile transmission job is completed.

First, at the time of confirming power state transition, the image forming apparatus 101 determines whether there is a job in execution (step S801). If the image forming apparatus 101 determines that there is no job in execution, it determines, based on setting information stored in the memory 303, the hard disk 106, or the like, whether at least one specific function is valid (step S802). In this example, mDNS and caller ID display are set to be valid, and the correspondence between each function and a device is acquired by looking up Table 1.

From Table 1, as for mDNS, it is determined to maintain power supply to the CPU 301, the memory 303, the hard disk 106, and the network controller 311 including the network interface card (NIC). As for caller ID display, it is determined to maintain power supply to the CPU 301, the memory 303, the hard disk 106, and the FAX device 107 including the FAX-CCU.

Hence, power supply is continued for at least the CPU 301, the memory 303, the hard disk 106, the network controller 311 including the NIC, and the FAX device 107 including the FAX-CCU, and power supply to the remaining devices is stopped.

As described above, according to the first embodiment, when a specific function having a restriction is valid, even if a job of the specific function is not executed, power supply to a device regarding the specific function is continued, whereas the image forming apparatus is transited to the power saving state. For example, even when the image forming apparatus performs sleep return in response to a request from another apparatus on the network, a failure in a response within a specific time to a request owing to the time taken for sleep return can be avoided.

Second Embodiment

In the second embodiment, when a specific function having a restriction on the reception response time via the network is valid, an image forming apparatus transits to the sleep state without decreasing (while maintaining) the link speed of the network. This embodiment will exemplify SIP as this specific function. In SIP, the image forming apparatus needs to send back a response within the specific time to a request from the SIP server. For example, this specific time is 4 seconds depending on the type of the SIP server.

In general, when an image forming apparatus 101 transits to the sleep state, the link speed is decreased to reduce power consumption. However, when the image forming apparatus 101 performs sleep return, the time taken to revert the link speed may be longer than the specific time for SIP. In this case, the image forming apparatus 101 cannot respond to the SIP server, and the connection is canceled. In this embodiment, therefore, when a specific function having a restriction on the reception response time is valid, the image forming apparatus 101 is transited to the sleep state while maintaining the link speed.

FIG. 10 is a flowchart showing the procedures of power feeding control processing according to this embodiment. Each processing in FIG. 10 is implemented by, for example, loading a program stored in a ROM to a RAM and executing it by a CPU 301.

In step S1001, the CPU 301 determines whether there is a job in execution at the time of confirming power state transition. If the CPU 301 determines that there is a job in execution, it maintains the current power supply state in step S1009. The power supply state in step S1009 will be defined as "power consumption 1: standby state". If the CPU 301 determines that there is no job in execution, it determines, in step S1002 based on setting information stored in a memory 303, a hard disk 106, or the like, whether specific functions are valid.

If the CPU 301 determines in step S1002 that the specific functions are not valid (are invalid), it decreases the link speed of the network in step S1003. Decreasing the link speed of the network will also be referred to as disabling the link maintenance mode. In step S1006, the CPU 301 stops power supply to devices other than minimum ones for interrupt processing. The power state in step S1006 will be defined as "power consumption 5: deep sleep state".

If the CPU 301 determines in step S1002 that at least one specific function is valid, it determines in step S1004 whether the valid specific function is only SIP. If the CPU 301 determines that the valid specific function is only SIP, it maintains the link speed of the network in step S1005. Maintaining the link speed of the network will also be referred to as enabling the link maintenance mode. In step S1007, the CPU 301 stops power supply to devices other than minimum ones for interrupt processing and maintenance of the link speed. The power state in step S1007 will be defined as "power consumption 4: link maintenance state".

If the CPU 301 determines in step S1004 that the valid specific function is not only SIP, it stops power supply to devices irrelevant to execution of the specific functions by looking up Table 1 in step S1008. For example, in the case of SIP, the CPU 301 looks up Table 1 and determines to maintain power supply to the CPU 301, the memory 303, the hard disk 106, and a network controller 311 including a NIC for SIP. Then, the CPU 301 controls to continue power supply to the CPU 301, the memory 303, the hard disk 106, and the network controller 311 including the NIC, and stop power supply to the remaining devices. The power state in step S1008 will be defined as "power consumption 2: connected sleep state".

In FIG. 1, the power consumption in "power consumption 1: standby state" is, for example, 26 to 50 W, and the power consumption in "power consumption 2: connected sleep state" is, for example, 12 to 18 W. The power consumption in "power consumption 4: link maintenance state" is, for example, 1.6 W, and the power consumption in "power consumption 5: deep sleep state" is, for example, 1 W or less.

As described above, according to the second embodiment, when a specific function having a restriction on the reception response time via the network is valid, the image forming apparatus is transited to the sleep state while maintaining the link speed. When this specific function is invalid, the link speed is decreased and the image forming apparatus is transited to the sleep state.

Third Embodiment

The third embodiment will describe SIP as an example of a specific function. SIP is used as a protocol for designating by a server the time interval of periodic reregistration of an IP terminal in the server. In addition to SIP, there are DHCP and the like as protocols for designating the IP terminal reregistration time interval by the server. However, it is often the case for DHCP that this time interval is a relatively long period such as 8 h or 24 h. To the contrary, in SIP used in IP-FAX in an NGN (Next Generation Network) environment, the SIP server defines 1 h as the IP terminal reregistration time interval. If half or less of the time is set for retransmission owing to a packet loss, reregistration in 30 min or less is necessary. An SIP server on a hub sometimes sets the IP terminal reregistration time interval by seconds depending on a product. From this, the IP terminal reregistration time interval of the SIP server is considered to be several seconds to several ten min.

In DHCP, the time interval of reregistration of an IP terminal in the server is a relatively long period such as 8 h or 24 h. In this case, an image forming apparatus 101 can enable the link maintenance mode and transit to the sleep state on condition that there is no job or there is no user operation for a predetermined period, as described in the second embodiment.

In general, the image forming apparatus often performs reregistration in the SIP server at a time interval of 40% of the IP terminal reregistration time interval defined by the SIP server, in order to enable recovery at the second packet even if the arrival of the first packet delays or a packet loss occurs. For example, when the set time interval in the SIP server is 1 h, the interval of transmission from the image forming apparatus 101 is 24 min, which is 40% of 1 h. When the set time interval in the SIP server is 10 min, the interval of transmission from the image forming apparatus 101 is 4 min, which is 40% of 10 min. When reregistration in the SIP server is performed at such a short time interval, for example, if there is no user operation or the like, the image forming apparatus 101 cannot transit to the sleep state even in a state in which only reregistration in the SIP server is performed.

In this embodiment, when a specific function having a restriction on the reception response time via the network is valid, a power saving state as a transition destination is changed by further considering the interval of transmission to the server (for example, the time interval of reregistration of an IP terminal in the SIP server).

FIG. 11 is a flowchart showing a procedure of power feeding control processing according to this embodiment. Each processing in FIG. 11 is implemented by, for example, loading a program stored in a ROM to a RAM and executing it by a CPU 301. The processing in FIG. 11 is different from that in FIG. 10 in the processing in step S1106. Steps S1101 to S1105 and S1107 to S1110 in FIG. 11 correspond to steps S1001 to S1005 and S1006 to S1009.

If the link maintenance mode is enabled in step S1105, the CPU 301 determines in step S1106 whether the set value of the time interval of reregistration of an IP terminal in the SIP server is equal to or larger than a predetermined threshold. If the CPU 301 determines that the set value is equal to or larger than the predetermined threshold, it advances to step S1108. If the CPU 301 determines that the set value is not equal to or larger than the predetermined threshold (is smaller than the threshold), it advances to step S1109.

More specifically, when the time interval of reregistration of an IP terminal in the SIP server is, for example, 2 min and is shorter than a predetermined threshold, the image forming apparatus 101 is transited to "power consumption 2: connected sleep state" in which power supply to devices irrelevant to execution of the specific function is stopped. That is, in the second embodiment, when the specific function is only SIP, it is only necessary to supply power to minimum devices for interrupt processing and maintenance of the link speed. However, when the reregistration time interval is shorter than the predetermined threshold, power supply to the CPU 301, a memory 303, a hard disk 106, and a network controller 311 including a NIC is continued. In the third embodiment, therefore, power is supplied to even portions (CPU 301, memory 303, and hard disk 106) to which power feeding can be stopped in the sleep state in the second embodiment. However, in the third embodiment, the reregistration operation of an IP terminal in the SIP server can be performed while reducing power consumption, compared to a case in which the image forming apparatus cannot be transited to the sleep state and "power consumption 1: standby state" is continued.

Figure 12A:
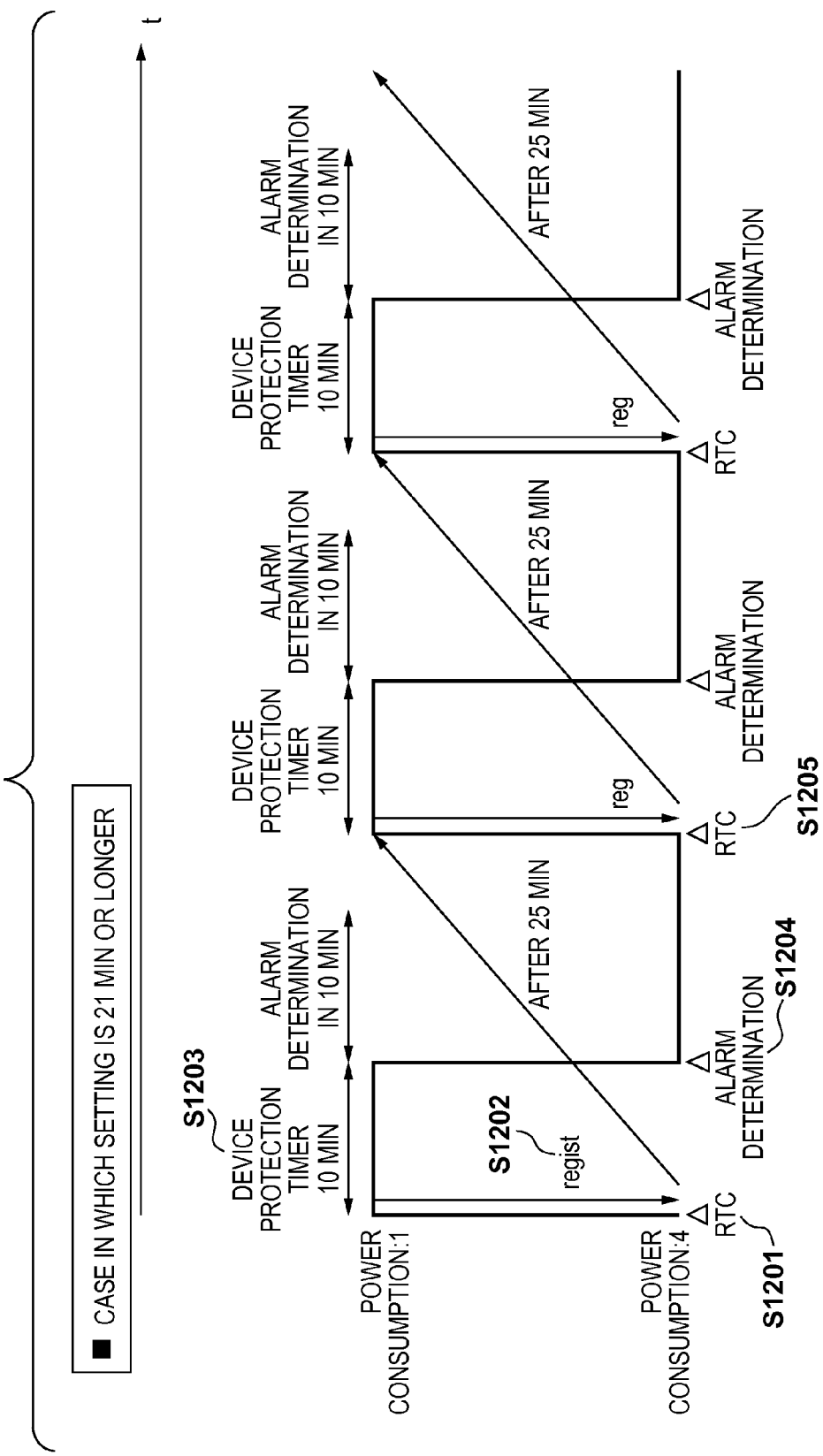
Figure 12C:
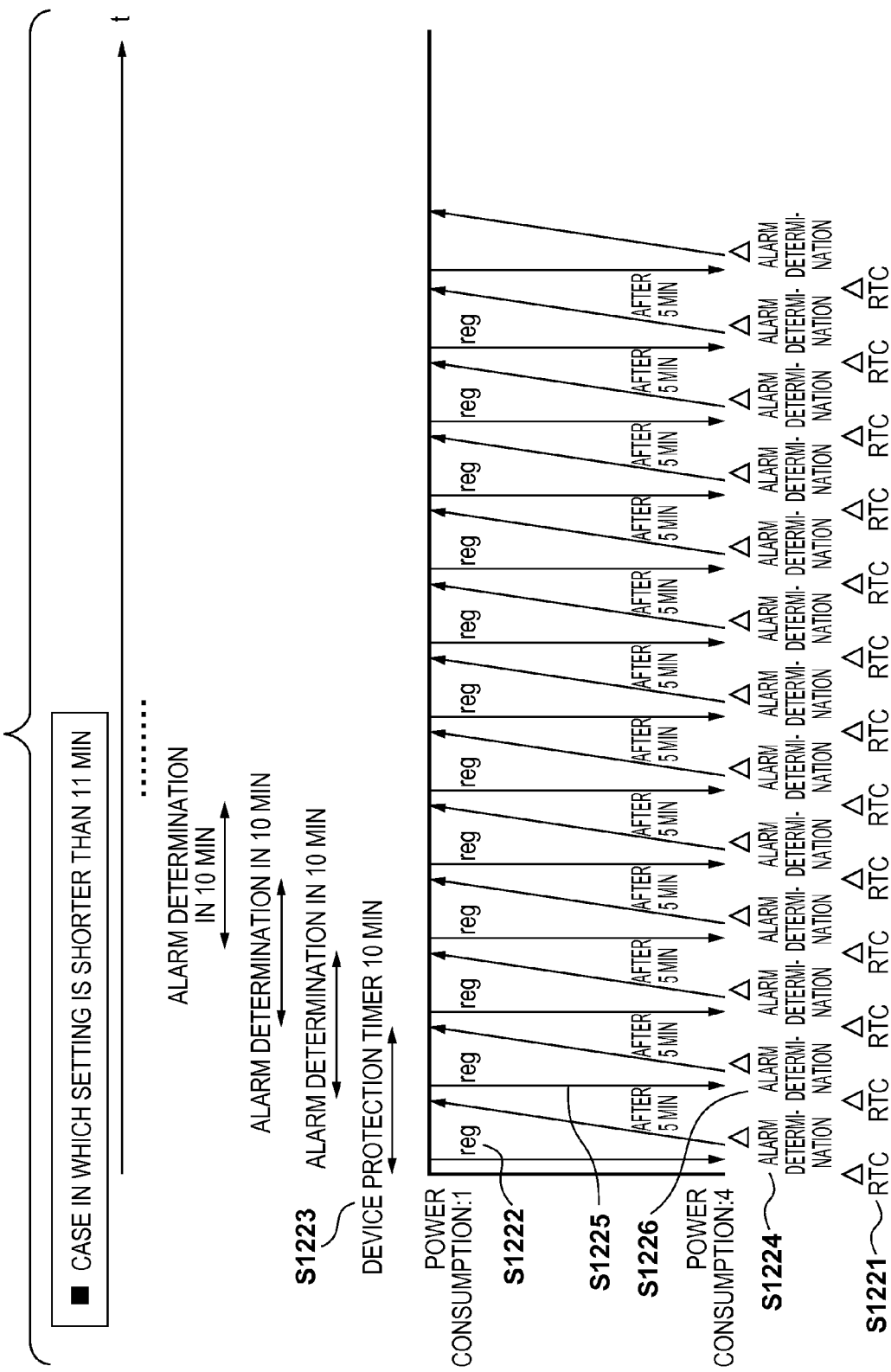

The effects of the third embodiment will be explained with reference to FIGS. 12A to 12C and FIGS. 13A to 13C. In FIGS. 12A to 12C and FIGS. 13A to 13C according to this embodiment, the ordinate indicates the power consumption amount, and the abscissa indicates the time axis. FIGS. 12A and 13A show a case in which the time interval of reregistration of an IP terminal in the SIP server is 21 min or longer. FIGS. 12B and 13B show a case in which the time interval of reregistration of an IP terminal in the SIP server is 11 min (inclusive) to 21 min (exclusive). FIGS. 12C and 13C show a case in which the time interval of reregistration of an IP terminal in the SIP server is shorter than 11 min. FIGS. 12A to 12C and FIGS. 13A to 13C show a case in which the predetermined threshold used in step S1106 is 20 min.

Case in which Set Time Interval of Reregistration is 21 Min or Longer

FIGS. 12A and 13A are views showing transition of the power state when the time interval of reregistration of an IP terminal in the SIP server is 21 min or longer. In step S1201 of FIG. 12A, the power state of the image forming apparatus 101 is sleep return from "power consumption 4: link maintenance state" serving as the sleep state to "power consumption 1: standby state" based on an RTC 312 which is one interrupt factor.

Immediately after the sleep return, the image forming apparatus 101 issues an event of setting the next IP terminal reregistration time interval, and sets again the IP terminal reregistration time interval in the RTC 312 (step S1202). The reregistration time interval is 25 min. After the sleep return from "power consumption 4: link maintenance state" to "power consumption 1: standby state", a device protection timer for the hard disk 106, a relay switch, and the like is activated (step S1203). Here, the device protection timer is 10 min.

After a time-out of the device protection timer occurs, it is determined whether there is an alarm at a close time (step S1204). The alarm is, for example, the next IP terminal reregistration time. This alarm determination is performed because even when power consumption is reduced, if the image forming apparatus returns soon owing to an interrupt, power consumption cannot be efficiently reduced. Here, the alarm determination is performed in 10 min.

In this example, since the IP terminal reregistration time interval is 25 min, it is determined in the alarm determination that there is no alarm, as shown in FIG. 12A. If it is determined that there is no alarm, the power state transits from "power consumption 1: standby state" to "power consumption 4: link maintenance state". After 15 min (25 min–the device protection timer of 10 min), the power state becomes sleep return again to "power consumption 1: standby state" (step S1205). The above-described processing is then repeated. Processing in FIG. 13A is the same as that in FIG. 12A.

Case in which Set Time Interval of Reregistration is 11 Min (Inclusive) to 21 Min (Exclusive)

FIGS. 12B and 13B are views showing transition of the power state when the time interval of reregistration of an IP terminal in the SIP server is 11 min (inclusive) to 21 min (exclusive).

In step S1211 of FIG. 12B, the power state of the image forming apparatus 101 is sleep return from "power consumption 4: link maintenance state" serving as the sleep state to "power consumption 1: standby state" based on the RTC 312 which is one interrupt factor.

Immediately after the sleep return, the image forming apparatus 101 issues an event of setting the next IP terminal reregistration time interval, and sets the IP terminal reregistration time interval in the RTC 312 (step S1212). The reregistration time interval is 15 min. After the sleep return from "power consumption 4: link maintenance state" to "power consumption 1: standby state", the device protection timer for the hard disk 106, the relay switch, and the like is activated (step S1213). Here, the device protection timer is 10 min.

After a time-out of the device protection timer occurs, it is determined whether there is an alarm at a close time (step S1214). Here, the alarm determination is performed in 10 min.

In this example, the IP terminal reregistration time interval is 15 min, 15 min−device protection timer of 10 min=5 min is included in the alarm determination of 10 min, as shown in FIG. 12B, so it is determined in the alarm determination that there is an alarm. Immediately after the reregistration time interval of 15 min has elapsed, an event of setting the next IP terminal reregistration time interval is issued to set the reregistration time interval again in the RTC 312 (step S1215). The reregistration time interval is 15 min.

Immediately after the resetting in the RTC 312, alarm determination is performed again (step S1216). In this alarm determination, 15 min after the resetting in the RTC is not included in the alarm determination of 10 min, as shown in FIG. 12B, so it is determined in the alarm determination that there is no alarm. If it is determined that there is no alarm, the power state transits from "power consumption 1: standby state" to "power consumption 4: link maintenance state".

The power state of the image forming apparatus 101 becomes sleep return from "power consumption 4: link maintenance state" serving as the sleep state to "power consumption 1: standby state" based on the RTC 312, 15 min after the resetting in the RTC 312 (step S1217). The above-described processing is then repeated.

In FIG. 12B, the power state is "power consumption 1: standby state" in the device protection timer of 10 min. However, when the device protection timer need not be activated, "power consumption 4: link maintenance state" may be set in this period.

FIG. 13B is a timing chart showing the result of executing the processing in FIG. 11. Since the reregistration time interval is 15 min in this example, it is determined in step S1106 of FIG. 11 that the reregistration time interval is shorter than the predetermined threshold of 20 min.

Although not shown in the timing chart of FIG. 13B, the processing in FIG. 11 is performed at the previous stage of step S1211, and the power state of the image forming apparatus 101 transits to "power consumption 2: connected sleep state" in step S1109. Thereafter, the power state of the image forming apparatus 101 maintains "power consumption 2: connected sleep state" as long as the reregistration operation of an IP terminal in the SIP server continues without any user operation or the like. Steps S1212 to S1217 in FIG. 13B are the same as steps S1212 to S1217 in FIG. 12B.

As shown in FIG. 13B, the total power consumption is reduced by a power state change 1302 according to this embodiment much more than by a power state change 1301. In FIG. 12B, power consumption is not constant between "power consumption 1: standby state" and "power consumption 4: link maintenance state". However, in FIG. 13B, power consumption can be kept constant in the connected sleep state.

Case in which Set Time Interval of Reregistration is Shorter than 11 Min

FIGS. 12C and 13C are views showing transition of the power state when the time interval of reregistration of an IP terminal in the SIP server is shorter than 11 min.

In step S1221 of FIG. 12C, the power state of the image forming apparatus 101 is sleep return from "power consumption 4: link maintenance state" serving as the sleep state to "power consumption 1: standby state" based on the RTC 312 which is one interrupt factor.

Immediately after the sleep return, the image forming apparatus 101 issues an event of setting the next IP terminal reregistration time interval, and sets again the IP terminal reregistration time interval in the RTC 312 (step S1222). The reregistration time interval is 5 min. After the sleep return from "power consumption 4: link maintenance state" to "power consumption 1: standby state", the device protection timer for the hard disk 106, the relay switch, and the like is activated (step S1223). Here, the device protection timer is 10 min.

Immediately after the resetting in the RTC 312, alarm determination is performed (step S1224). In this alarm determination, measurement has not started in the alarm determination of 10 min, as shown in FIG. 12C, so it is determined that there is no alarm. However, since the device protection timer has been activated, "power consumption 1: standby state" is maintained. Immediately after the lapse of the reregistration time interval of 5 min, an event of setting the next IP terminal reregistration time interval of 5 min is issued to set the reregistration time interval again in the RTC 312 (step S1225).

Immediately after the resetting in the RTC 312, alarm determination is performed again (step S1226). In this example, the reregistration time interval of 5 min is included in the alarm determination of 10 min, so it is always determined in the alarm determination that there is an alarm. Hence, the power state of the image forming apparatus 101 does not transit from "power consumption 1: standby state" to the sleep state.

FIG. 13C is a timing chart showing the result of executing the processing in FIG. 11. Since the reregistration time interval is 5 min in this example, it is determined in step S1106 of FIG. 11 that the reregistration time interval is shorter than the predetermined threshold of 20 min.

Although not shown in the timing chart of FIG. 13C, the processing in FIG. 11 is performed at the previous stage of step S1221, and the power state of the image forming apparatus 101 transits to "power consumption 2: connected sleep state" in step S1109. Thereafter, the power state of the image forming apparatus 101 maintains "power consumption 2: connected sleep state" as long as the reregistration operation of an IP terminal in the SIP server continues without any user operation or the like. Steps S1222 to S1226 in FIG. 13C are the same as steps S1222 to S1226 in FIG. 12C.

As shown in FIG. 13C, power consumption can be reduced from a power state change 1303 to a power state change 1304 according to this embodiment.

As shown in FIGS. 12A to 12C, when a specific function having a restriction on the reception response time via the network is valid and transmission to the server needs to be performed at a short time interval, the image forming apparatus cannot transit to the power saving mode and needs to maintain a state in which power consumption is high. In this embodiment, therefore, the power state transition destination is changed in accordance with the transmission time interval, as shown in FIGS. 13A to 13C. As a result, the power consumption of the image forming apparatus 101 can be efficiently reduced.

Fourth Embodiment

In an image forming apparatus 101 according to the fourth embodiment, a specific function that has a restriction on the reception response time via the network and performs transmission to a server at a short time interval, and a hard disk 106 having a long spin-up time is mounted. In the fourth embodiment, the power state transition destination of the image forming apparatus 101 is changed in accordance with the length of the spin-up time of the hard disk 106, in addition to the operation according to the above-described third embodiment. In addition to SIP, there are DHCP and the like as protocols for designating the IP terminal reregistration time interval by the server. However, even this embodiment will exemplify SIP in which the reregistration time interval is relatively short.

FIG. 14 is a flowchart showing the procedures of power feeding control processing according to this embodiment. Each processing in FIG. 14 is implemented by, for example, loading a program stored in a ROM to a RAM and executing it by a CPU 301. The processing in FIG. 14 is different from that in FIG. 11 in steps S1406 to S1409 and S1412. Steps S1401 to S1406, S1410, S1411, S1413, and S1414 in FIG. 14 correspond to steps S1101 to S1106, S1107, S1108, S1109, and S1110.

If it is determined in step S1406 that the set value of the time interval of reregistration of an IP terminal in the SIP server is equal to or larger than a predetermined threshold, the CPU 301 determines in step S1407 whether the spin-up time of a hard disk 106 is equal to or longer than a threshold. If the CPU 301 determines that the spin-up time is shorter than the threshold, it advances to step S1408. If the spin-up time is equal to or longer than the threshold, the CPU 301 advances to step S1409. The determination in step S1407 may be performed based on, for example, a table that is saved in advance in the storage area and represents the correspondence between the spin-up time and the hard disk model. It is also possible to actually measure the time till an R/W possible state after the start of driving the hard disk 106 upon turning on the image forming apparatus 101, and make the determination based on the measurement value.

In step S1408, the CPU 301 sets to stop driving of the hard disk 106 when transiting to the sleep state. When it is set as a default to stop driving of the hard disk 106 when transiting to the sleep state, the CPU 301 advances to step S1411 without particularly performing processing in step S1408. In step S1411, the CPU 301 stops power supply to devices other than minimum ones for interrupt processing and maintenance of the link speed ("power consumption 4: link maintenance state").

In step S1409, the CPU 301 sets to start driving of the hard disk 106 (maintain the rotation speed) when transiting to the sleep state. In step S1412, the CPU 301 stops power supply to devices other than minimum ones for interrupt processing, maintenance of the link speed, and maintenance of rotation of the hard disk ("power consumption 3: hard disk rotation holding state").

As described above, according to the fourth embodiment, when the spin-up time of the hard disk 106 is long, the image forming apparatus transits to the sleep state while maintaining rotation of the hard disk 106. This can prevent a failure in the reregistration operation of an IP terminal in the server owing to the spin-up time at the time of sleep return.

The determination processing in step S1407 is performed at the subsequent stage of the determination processing in step S1406 in FIG. 14, but may be performed at another portion. For example, the determination processing in step S1407 may be performed when it is determined in step S1402 that a specific function is invalid. In this case, if it is determined that the spin-up time is longer than the threshold, power supply to devices other than minimum ones for interrupt processing and maintenance of rotation of the hard disk is stopped, and as a result, the image forming apparatus transits to a power consumption state between steps S1410 and S1411. That is, the image forming apparatus transits to a power consumption state in which power consumption for maintaining driving of the hard disk is added to power consumption used when it is determined that the spin-up time is shorter than the threshold.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-208340, filed Oct. 9, 2014, which is hereby incorporated by reference herein in its entirety.

What is claimed is:
1. An image forming apparatus comprising:
a network controller configured to receive data via a network from an external device and transmit data via a network to an external device;
a processor configured to process the data received by the network controller;

an operation unit configured to receive, from a user, an instruction to enable a specific function regarding network transmission or reception; and a power control unit configured to, when a condition to shift the image forming apparatus to a power saving state is satisfied, if the specific function is enabled, shift the image forming apparatus to a first power saving state in which power is supplied to the processor and the network controller, and if the specific function is disabled, shift the image forming apparatus to a second power saving state in which no power is supplied to the processor and power is supplied to the network controller.

2. The image forming apparatus according to claim 1, wherein the network controller is further configured to control a communication speed of the network controller, wherein when the power control unit shifts the image forming apparatus to the first power saving state, the network controller does not change the communication speed of the network controller.

3. The image forming apparatus according to claim 2, wherein when the power control unit shifts the image forming apparatus to the second power saving state, the network controller decreases the communication speed of the network controller.

4. The image forming apparatus according to claim 1, wherein, if a function associated with SIP (Session Initiation Protocol) as the specific function is enabled, the network controller transmits a response to a request from an SIP (Session Initiation Protocol) server.

5. The image forming apparatus according to claim 1, wherein the operation unit includes a display unit configured to display a screen for enabling or disabling the specific function.

6. The image forming apparatus according to claim 1, further comprising an image processor configured to perform image processing, wherein in the first power saving state or the second power saving state, no power is supplied to the image processor.

7. The image forming apparatus according to claim 6, wherein the power control unit, when the condition to shift the image forming apparatus to the power saving state is satisfied, if the specific function is enabled, shifts the image forming apparatus to the first power saving state from a standby power state in which power is supplied to the image processor, the processor, and the network controller, and if the specific function is disabled, shifts the image forming apparatus to the second power saving state from the standby power state.

8. The image forming apparatus according to claim 1, wherein the processor is further configured to determine the power saving state to be shifted, when the condition to shift the image forming apparatus to the power saving state is satisfied, based on a setting of the specific function.

9. The image forming apparatus according to claim 8, wherein the processor determines the first power saving state as the power saving state to be shifted when the condition to shift the image forming apparatus to the power saving state is satisfied in a case where the specific function is enabled, and determines the second power saving state as the power saving state to be shifted when the condition to shift the image forming apparatus to the power saving state is satisfied in a case where the specific function is disabled.

10. The image forming apparatus according to claim 1, wherein the specific function is a function associated with SIP (Session Initiation Protocol), a function associated with Multicast DNS, a function associated with Modem Dial-in, a function associated with Caller ID Display, a function associated with BMLinkS, a function associated with IEEE802.1X, a function associated with Auto IP, a function associated with NetWare, a function associated with AppleTalk, a function associated with Facsimile Fixed Reception, a function associated with Facsimile Incoming Call Ringing, or a function associated with Facsimile Remote Reception.

11. The image forming apparatus according to claim 1, further comprising a hard disk drive, wherein, in the first power saving state, power is supplied to the hard disk drive, and, in the second power saving state, no power is supplied to the hard disk drive.

12. The image forming apparatus according to claim 1, wherein, if a function associated with Multicast DNS as the specific function is enabled, the network controller transmits a response to a request from an external device.

13. The image forming apparatus according to claim 1, wherein, if a function having a restriction on a response time as the specific function is enabled, a connection with the external device is cancelled in a case where a response is not provided within a predetermined time to a request associated with the specific function from the external device.

14. The image forming apparatus according to claim 1, wherein, if a function having a restriction on a processing object as the specific function is enabled, the processor performs a protocol analysis or a password authentication, wherein the network controller is not configured to perform the protocol analysis and the password authentication.

15. The image forming apparatus according to claim 1, wherein, if a function having a restriction on a transmission interval as the specific function is enabled, the network controller regularly transmits information associated with the specific function to the external device.

16. The image forming apparatus according to claim 1, further comprising a facsimile unit configured to receive facsimile data, wherein, if a function associated with a facsimile as the specific function is enabled, the facsimile unit rings a bell in accordance with a reception of the facsimile data.

17. A control method to be executed in an image forming apparatus, the image forming apparatus including a network controller configured to receive data via a network from an external device and transmit data via a network to an external device, and a processor configured to process the data received by the network controller, the control method comprising:

a receiving step of receiving, from a user, an instruction to enable a specific function regarding network transmission or reception; and a power control step of, when a condition to shift the image forming apparatus to a power saving state is satisfied, and if the specific function is enabled, shifting the image forming apparatus to a first power saving state in which power is supplied to the processor and the network controller, and if the specific function is disabled, shifting the image forming apparatus to a second power saving state in which no power is supplied to the processor and power is supplied to the network controller.

18. The method according to claim 17, wherein when the image forming apparatus shifts to the first power saving state in the power control step, the network controller does not change a communication speed of the network controller.

19. The method according to claim 18, wherein when the image forming apparatus shifts to the second power saving state in the power control step, the network controller decreases the communication speed of the network controller.

20. The method according to claim 17, wherein if a function associated with SIP (Session Initiation Protocol) as the specific function is enabled, the network controller transmits a response to a request from an SIP (Session Initiation Protocol) server.

21. The method according to claim 17, further comprising a display step of displaying a screen for enabling or disabling the specific function.

22. The method according to claim 17, wherein when the image forming apparatus shifts to the first power saving state or the second power saving state in the power control step, no power is supplied to an image processor configured to perform image processing.

23. An image forming apparatus comprising:
a network controller configured to receive data via a network from an external device and transmit data via a network to an external device;
a processor configured to process the data received by the network controller;
an operation unit configured to receive, from a user, an instruction to enable a specific function regarding network transmission or reception; and
a power control unit configured to shift the image forming apparatus to a first power saving state in which power is supplied to the processor and the network controller, and shift the image forming apparatus to a second power saving state in which no power is supplied to the processor and power is supplied to the network controller,
wherein the processor permits the power control unit to shift the image forming apparatus to the first power saving state and not shift the image forming apparatus to the second power saving state, in a case where the specific function is enabled,
wherein the processor permits the power control unit to shift the image forming apparatus to the second power saving state in a case where the specific function is disabled.

24. The image forming apparatus according to claim 23, further comprising a communication control unit configured to control communication speed of the network controller,
wherein when the power control unit shifts the image forming apparatus to the first power saving state, the communication control unit does not change the communication speed of the network controller.

25. The image forming apparatus according to claim 24, wherein when the power control unit shifts the image forming apparatus to the second power saving state, the communication control unit decreases the communication speed of the network controller.

26. The image forming apparatus according to claim 23, wherein, if a function associated with SIP (Session Initiation Protocol) as the specific function is enabled, the network controller transmits a response to a request from a SIP (Session Initiation Protocol) server.

27. The image forming apparatus according to claim 23, wherein the operation unit includes a display unit configured to display a screen for enabling or disabling the specific function.

28. The image forming apparatus according to claim 23, further comprising an image processing processor configured to perform image processing,
wherein in the first power saving state or the second power saving state, no power is supplied to the image processing processor.

29. The image forming apparatus according to claim 28, wherein the power control unit, when the condition to shift the image forming apparatus to the power saving state is satisfied, if the specific function is enabled, shifts the image forming apparatus to the first power saving state from a standby power state in which power is supplied to the image processing processor, the processor, and the network controller, and if the specific function is disabled, shifts the image forming apparatus to the second power saving state from the standby power state.

30. The image forming apparatus according to claim 23, wherein the processor is further configured to determine the power saving state to be shifted, when the condition to shift the image forming apparatus to the power saving state is satisfied, based on a setting of the specific function.

31. The image forming apparatus according to claim 30, wherein the processor determines the first power saving state as the power saving state to be shifted when the condition to shift the image forming apparatus to the power saving state is satisfied in a case where the specific function is enabled, and determines the second power saving state as the power saving state to be shifted when the condition to shift the image forming apparatus to the power saving state is satisfied in a case where the specific function is disabled.

32. The image forming apparatus according to claim 23, wherein the specific function is a function associated with SIP (Session Initiation Protocol), a function associated with Multicast DNS, a function associated with Modem Dial-in, a function associated with Caller ID Display, a function associated with BMLinkS, a function about IEEE802.1X, a function associated with Auto IP, a function associated with NetWare, a function associated with AppleTalk, a function associated with Facsimile Fixed Reception, a function associated with Facsimile Incoming Call Ringing, or a function associated with Facsimile Remote Reception.

33. The image forming apparatus according to claim 23, further comprising a hard disk drive,
wherein, in the first power saving state, power is supplied to the hard disk drive, and, in the second power saving state, no power is supplied to the hard disk drive.

34. The image forming apparatus according to claim 23, wherein, if a function associated with Multicast DNS as the specific function is enabled, the network controller transmits a response to a request from an external device.

35. The image forming apparatus according to claim 23, wherein, if a function having a restriction on a response time as the specific function is enabled, a connection with the external device is cancelled in a case where a response is not provided within a predetermined time to a request associated with the specific function from the external device.

36. The image forming apparatus according to claim 23, wherein, if a function having a restriction on a processing object as the specific function is enabled, the processor performs a protocol analysis or a password authentication, wherein the network controller is not configured to perform the protocol analysis and the password authentication.

37. The image forming apparatus according to claim 23, wherein, if a function having a restriction on a transmission interval as the specific function is enabled, the network controller regularly transmits information associated with the specific function to the external device.

38. The image forming apparatus according to claim 23, further comprising a facsimile unit configured to receive facsimile data, wherein, if a function associated with a facsimile as the specific function is enabled, the facsimile unit rings a bell in accordance with a reception of the facsimile data.

* * * * *